US011602768B2

(12) United States Patent
Gibanel et al.

(10) Patent No.: US 11,602,768 B2
(45) Date of Patent: Mar. 14, 2023

(54) ACRYLIC POLYMERS AND COMPOSITIONS CONTAINING SUCH POLYMERS

(71) Applicant: SWIMC LLC, Cleveland, OH (US)

(72) Inventors: Sebastien Gibanel, Givry (FR); Marie Braillon, Tournus (FR); Samuel Puaud, Tournus (FR)

(73) Assignee: SWIMC, LLC, Cleveland, OH (US)

( * ) Notice: Subject to any disclaimer, the term of this patent is extended or adjusted under 35 U.S.C. 154(b) by 139 days.

(21) Appl. No.: 16/757,134

(22) PCT Filed: May 10, 2018

(86) PCT No.: PCT/US2018/032134
§ 371 (c)(1),
(2) Date: Apr. 17, 2020

(87) PCT Pub. No.: WO2019/078925
PCT Pub. Date: Apr. 25, 2019

(65) Prior Publication Data
US 2020/0248003 A1   Aug. 6, 2020
US 2022/0289985 A9   Sep. 15, 2022

Related U.S. Application Data

(63) Continuation-in-part of application No. 16/342,873, filed on Apr. 17, 2019, and a continuation-in-part of
(Continued)

(51) Int. Cl.
| | | |
|---|---|---|
| C09D 5/02 | (2006.01) |
| B05D 7/22 | (2006.01) |
| C08F 2/22 | (2006.01) |
| B65D 23/02 | (2006.01) |
| C09D 133/02 | (2006.01) |
| B65D 25/14 | (2006.01) |
| B65D 51/00 | (2006.01) |
| C08L 33/06 | (2006.01) |
| C09D 133/10 | (2006.01) |
| C09D 7/65 | (2018.01) |
| C08F 220/18 | (2006.01) |
| C09D 125/14 | (2006.01) |
| C09D 7/20 | (2018.01) |
| C08F 212/08 | (2006.01) |
| C08F 220/06 | (2006.01) |
| C08F 220/14 | (2006.01) |
| C09D 133/06 | (2006.01) |
| C09D 133/08 | (2006.01) |
| B05D 7/14 | (2006.01) |
| B05D 1/02 | (2006.01) |

(52) U.S. Cl.
CPC .............. *B05D 7/227* (2013.01); *B05D 7/14* (2013.01); *B65D 23/02* (2013.01); *B65D 25/14* (2013.01); *B65D 51/00* (2013.01); *C08F 2/22* (2013.01); *C08F 212/08* (2013.01); *C08F 220/06* (2013.01); *C08F 220/14* (2013.01); *C08F 220/1802* (2020.02); *C08F 220/1804* (2020.02); *C08F 220/1806* (2020.02); *C08L 33/06* (2013.01); *C09D 5/022* (2013.01); *C09D 5/024* (2013.01); *C09D 7/20* (2018.01); *C09D 7/65* (2018.01); *C09D 125/14* (2013.01); *C09D 133/02* (2013.01); *C09D 133/066* (2013.01); *C09D 133/08* (2013.01); *C09D 133/10* (2013.01); *B05D 1/02* (2013.01); *B05D 2202/25* (2013.01); *B05D 2520/05* (2013.01); *C08F 2800/20* (2013.01); *C08F 2810/20* (2013.01)

(58) Field of Classification Search
CPC .... C09D 5/022; C09D 125/14; C09D 133/02; C09D 7/20; C09D 133/066; C08F 220/1806; C08F 220/14; C08F 212/08; C08F 220/06; C08F 2810/20; C08F 2800/20; B65D 25/14
USPC .......................................................... 428/461
See application file for complete search history.

(56) References Cited

U.S. PATENT DOCUMENTS

| | | |
|---|---|---|
| 3,943,187 A | 3/1976 | Wu |
| 4,071,463 A | 1/1978 | Steinhauer |
| (Continued) | | |

FOREIGN PATENT DOCUMENTS

| | | |
|---|---|---|
| CN | 101040016 A | 9/2007 |
| CN | 102492346 | 6/2012 |
| (Continued) | | |

OTHER PUBLICATIONS

Yoo et al., Journal of Applied Polymer Science, 112, 1587-1594, 2009. (Year: 2009).*
Office Action for Chinese Application No. 201780064566.2, dated Nov. 4, 2020, 14 pages.
Primid® SF-4510, Technical Data Sheets, PRIMID® EMS-CHEMIE AG, 2 sheets (2009).
Primid® XL-552, Technical Data Sheets, PRIMID® EMS-CHEMIE AG, 2 sheets (2009).
(Continued)

*Primary Examiner* — Hui H Chin
(74) *Attorney, Agent, or Firm* — Patterson Thuente, P.A.

(57) ABSTRACT

Coated articles, methods and coating compositions containing (a) a crosslinkable carboxyl-functional acrylic polymer made by polymerizing monomers including acidic monomer, multi-ethylenically unsaturated monomer and optional styrene or substituted styrene, and (b) a nitrogen-containing carboxyl-reactive crosslinking agent such as a beta-hydroxyalkylamide or beta-hydroxyalkylurea compound. The coating composition is useful in coating metal substrates including interior or exterior surfaces of food or beverage cans. The cured coating compositions can exhibit both good flexibility and high Tg.

19 Claims, No Drawings

Related U.S. Application Data application No. PCT/US2017/057432, filed on Oct. 19, 2017, said application No. 16/342,873 is a continuation-in-part of application No. PCT/US2017/057432.

(60) Provisional application No. 62/410,255, filed on Oct. 19, 2016.

(56) References Cited

U.S. PATENT DOCUMENTS

| | | |
|---|---|---|
| 4,076,676 A | 2/1978 | Sommerfeld |
| 4,076,917 A | 2/1978 | Swift et al. |
| 4,212,781 A | 7/1980 | Evans et al. |
| 4,247,439 A | 1/1981 | Matthews et al. |
| 4,285,847 A | 8/1981 | Ting |
| 4,289,674 A | 9/1981 | Christenson et al. |
| 4,305,859 A | 12/1981 | McEwan et al. |
| 4,383,075 A | 5/1983 | Abel |
| 4,383,475 A | 5/1983 | Abel |
| 4,413,015 A | 11/1983 | Anderson et al. |
| 4,443,568 A | 4/1984 | Woo |
| 4,446,258 A | 5/1984 | Chu et al. |
| 4,476,262 A | 10/1984 | Chu et al. |
| 4,487,859 A | 12/1984 | Martino |
| 4,499,212 A | 2/1985 | Martino |
| 4,503,173 A | 3/1985 | Martino et al. |
| 4,517,322 A | 5/1985 | Birkmeyer et al. |
| 4,522,961 A | 6/1985 | Martino et al. |
| 4,522,962 A | 6/1985 | Abbey et al. |
| 4,868,016 A | 9/1989 | Lorah et al. |
| 4,948,834 A | 8/1990 | Baker et al. |
| 4,963,602 A | 10/1990 | Patel |
| 4,988,781 A | 1/1991 | McKinney et al. |
| 5,043,380 A | 8/1991 | Cole |
| 5,157,078 A | 10/1992 | Woo et al. |
| 5,201,436 A | 4/1993 | Owens et al. |
| 5,264,469 A | 11/1993 | Mysliwczyk et al. |
| 5,266,628 A | 11/1993 | Essary et al. |
| 5,296,525 A | 3/1994 | Spencer |
| 5,387,625 A | 2/1995 | Parekh et al. |
| 5,527,840 A | 6/1996 | Chutko et al. |
| 5,532,297 A | 7/1996 | Woo et al. |
| 5,714,539 A | 2/1998 | Perez et al. |
| 5,830,952 A | 11/1998 | Pedersen et al. |
| 5,869,552 A | 2/1999 | Pedersen et al. |
| 5,877,239 A | 3/1999 | Craun et al. |
| 5,922,817 A | 7/1999 | Pedersen et al. |
| 6,008,273 A | 12/1999 | Leibelt et al. |
| 6,518,334 B1 | 2/2003 | Calhoun et al. |
| 6,710,113 B2 | 3/2004 | Weitzel |
| 6,762,240 B2 | 7/2004 | Swarup et al. |
| 6,992,121 B1 | 1/2006 | Peters et al. |
| 7,037,584 B2 | 5/2006 | Wind et al. |
| 7,189,787 B2 | 3/2007 | O'Brien et al. |
| 7,592,047 B2 | 9/2009 | O'Brien et al. |
| 7,682,699 B2 | 3/2010 | Wind et al. |
| 7,695,770 B2 | 4/2010 | Dombrowski |
| 7,803,865 B2 | 9/2010 | Moncla et al. |
| 7,947,776 B2 | 5/2011 | Moncla et al. |
| 8,057,893 B2 | 11/2011 | Killilea et al. |
| 8,092,876 B2 | 1/2012 | O'Brien et al. |
| 8,105,744 B2 | 1/2012 | Matsumura |
| 8,142,868 B2 | 3/2012 | O'Brien et al. |
| 8,173,265 B2 | 5/2012 | O'Brien et al. |
| 8,202,578 B2 | 6/2012 | Killilea et al. |
| 8,476,376 B2 | 7/2013 | Grenda et al. |
| 8,617,663 B2 | 12/2013 | O'Brien et al. |
| 8,835,012 B2 | 9/2014 | O'Brien et al. |
| 8,907,005 B2 | 12/2014 | Dombrowski et al. |
| 8,932,718 B2 | 1/2015 | Garner et al. |
| 9,012,027 B2 | 4/2015 | Nabuurs et al. |
| 9,029,470 B2 | 5/2015 | Rademacher et al. |
| 9,096,753 B2 | 8/2015 | Roller et al. |
| 9,181,448 B2 | 11/2015 | Li et al. |
| 9,242,763 B2 | 1/2016 | O'Brien et al. |
| 9,394,456 B2 | 7/2016 | Rademacher et al. |
| 9,404,006 B2 | 8/2016 | Li |
| 9,409,219 B2 | 8/2016 | Niederst et al. |
| 9,415,900 B2 | 8/2016 | O'Brien et al. |
| 9,422,444 B2 | 8/2016 | Lundgard et al. |
| 9,540,484 B2 | 1/2017 | Craun et al. |
| 9,605,177 B2 | 3/2017 | Tang et al. |
| 9,850,395 B2 | 12/2017 | Myers |
| 9,862,854 B2 | 1/2018 | O'Brien et al. |
| 10,501,639 B2 | 12/2019 | O'Brien et al. |
| 10,759,958 B2 | 9/2020 | Lindenmuth et al. |
| 10,836,915 B2 | 11/2020 | O'Brien et al. |
| 11,299,574 B2 | 4/2022 | Hibben et al. |
| 2002/0155235 A1 | 10/2002 | Taylor et al. |
| 2003/0059618 A1 | 3/2003 | Takai |
| 2003/0170396 A1 | 9/2003 | Yokoi et al. |
| 2004/0236005 A1 | 11/2004 | Scheerder et al. |
| 2005/0196629 A1 | 9/2005 | Bariatinsky et al. |
| 2006/0100366 A1 | 5/2006 | Obrien et al. |
| 2010/0063201 A1 | 3/2010 | Yamamoto |
| 2010/0068433 A1 | 3/2010 | Gibanel et al. |
| 2011/0224378 A1 | 9/2011 | Grenda et al. |
| 2012/0118785 A1 | 5/2012 | Kainz et al. |
| 2012/0302690 A1 | 11/2012 | Cunningham et al. |
| 2013/0143039 A1 | 6/2013 | Wilbur et al. |
| 2013/0206756 A1 | 8/2013 | Niederst et al. |
| 2013/0281574 A1 | 10/2013 | Li et al. |
| 2013/0316109 A1 | 11/2013 | Niederst et al. |
| 2014/0322465 A1 | 10/2014 | Kaleem et al. |
| 2014/0378600 A1 | 12/2014 | Hibben et al. |
| 2015/0004420 A1 | 1/2015 | Hill et al. |
| 2015/0021323 A1 | 1/2015 | Niederst et al. |
| 2015/0147501 A1 | 5/2015 | Lindenmuth et al. |
| 2015/0147502 A1 | 5/2015 | Lindenmuth et al. |
| 2015/0197597 A1 | 7/2015 | Gallucci et al. |
| 2015/0197657 A1 | 7/2015 | Niederst et al. |
| 2016/0009941 A1 | 1/2016 | Rademacher |
| 2016/0017171 A1 | 1/2016 | Li et al. |
| 2016/0024325 A1 | 1/2016 | Li |
| 2016/0107818 A1 | 4/2016 | Kaleem et al. |
| 2016/0122581 A1 | 5/2016 | You et al. |
| 2016/0297994 A1 | 10/2016 | Kuo et al. |
| 2016/0376446 A1 | 12/2016 | Gibanel et al. |
| 2017/0002227 A1 | 1/2017 | Gibanel et al. |
| 2017/0369603 A1* | 12/2017 | Gibanel .............. C08L 33/10 |
| 2018/0291227 A1* | 10/2018 | Singer .............. C09D 133/12 |
| 2019/0023940 A1 | 1/2019 | Chasser et al. |
| 2019/0249029 A1 | 4/2019 | Gibanel et al. |
| 2019/0292398 A1 | 9/2019 | Gao et al. |
| 2020/0109293 A1 | 4/2020 | O'Brien et al. |
| 2020/0247010 A1 | 8/2020 | Gorin et al. |
| 2020/0385602 A1 | 12/2020 | O'Brien et al. |

FOREIGN PATENT DOCUMENTS

| | | |
|---|---|---|
| CN | 102766382 | 11/2012 |
| CN | 103013303 | 4/2013 |
| EP | 0 114 909 A1 | 8/1984 |
| EP | 0 256 391 A2 | 2/1988 |
| EP | 0 101 307 B1 | 5/1989 |
| EP | 0 628 613 A2 | 12/1994 |
| EP | 1 474 454 B1 | 11/2009 |
| EP | 3 303 490 B1 | 4/2018 |
| GB | 1 555 868 | 11/1979 |
| GB | 1 574 721 | 9/1980 |
| JP | 53-39387 | 4/1978 |
| JP | S62223211 A | 10/1987 |
| JP | S6320311 A | 1/1988 |
| JP | 5-43830 | 2/1993 |
| JP | H05132647 A | 5/1993 |
| JP | H08231925 A | 9/1996 |
| JP | 2002-1555234 A | 5/2002 |
| JP | 2002155234 A | 5/2002 |
| JP | 2013-151608 | 8/2013 |
| JP | 2015-196812 | 11/2015 |
| WO | 0000527 A1 | 1/2000 |
| WO | WO 02/064691 A2 | 8/2002 |
| WO | WO 2005/121595 A2 | 12/2005 |

(56) References Cited

FOREIGN PATENT DOCUMENTS

| | | |
|---|---|---|
| WO | WO 2006/045017 | 4/2006 |
| WO | WO 2008/036628 A1 | 3/2008 |
| WO | WO2008036629 A2 | 3/2008 |
| WO | WO 2010/097353 A1 | 9/2010 |
| WO | 2011009024 A1 | 1/2011 |
| WO | WO 2011/005743 | 1/2011 |
| WO | WO 2011/057781 | 5/2011 |
| WO | WO 2011/057781 A2 | 5/2011 |
| WO | WO 2012/089747 A1 | 7/2012 |
| WO | WO 2012/118500 A1 | 9/2012 |
| WO | WO 2012/170623 A2 | 12/2012 |
| WO | WO 2013/191825 A1 | 12/2013 |
| WO | WO 2013/191826 A1 | 12/2013 |
| WO | 2014022703 A1 | 2/2014 |
| WO | 2014025411 A1 | 2/2014 |
| WO | WO 2014/089410 A1 | 6/2014 |
| WO | WO 2014/105466 A2 | 7/2014 |
| WO | WO 2014/134442 A1 | 9/2014 |
| WO | WO 2014/139971 A1 | 9/2014 |
| WO | WO 2014/139973 A1 | 9/2014 |
| WO | 2014186725 A1 | 11/2014 |
| WO | WO 2014/186285 A1 | 11/2014 |
| WO | WO 2015/002958 A1 | 1/2015 |
| WO | WO 2015/002961 A1 | 1/2015 |
| WO | WO 2015/006522 A1 | 1/2015 |
| WO | 2015057932 A1 | 4/2015 |
| WO | 2015160788 A1 | 10/2015 |
| WO | 2015164703 A1 | 10/2015 |
| WO | 2015179064 A1 | 11/2015 |
| WO | WO 2016/105502 A1 | 6/2016 |
| WO | WO 2016/105504 A1 | 6/2016 |
| WO | 2016201407 A1 | 12/2016 |
| WO | WO 2016/196174 A1 | 12/2016 |
| WO | WO 2016/196190 A1 | 12/2016 |
| WO | WO 2017/079437 A1 | 5/2017 |
| WO | WO 2017/112837 A1 | 6/2017 |
| WO | WO2017112837 | 6/2017 |
| WO | WO 2017/180895 A1 | 10/2017 |
| WO | WO 2018/013766 A1 | 1/2018 |
| WO | WO 2018/075762 A1 | 4/2018 |
| WO | 2018085052 A1 | 5/2018 |
| WO | 2018185094 A1 | 10/2018 |
| WO | 2019113594 A1 | 6/2019 |
| WO | 2019118697 A1 | 6/2019 |

OTHER PUBLICATIONS

Tsukahara, N. et al., "Reactive Emulsifiers for Emulsion Polymerization", PCI Paint & Coatings Industry, 7 pages (Sep. 5, 2013).
Park et al., "Kinetics of latex formation of PBMA latex in the presence of alkali soluble resin using atomic force microscopy", Colloid Polym Sci, 276, pp. 709-714 (1998).
Wu et al., "Alkali-soluble resins (ASR) and acrylic blends: influence of ASR distribution on latex film and paint properties", J. Coat. Technol. Res., 13 (4) pp. 655-665 (May 20, 2016).
First Examination Report, India Application No. 201917018045, dated Jan. 25, 2021, 6 pages.
Youngjae Yoo et al., "Preparation of Acrylic Copolymers and Crosslinking Agents and Properties as a Film," Journal of Applied Polymer Science, 112:1587-1594, 2009.
"CYMEL 303 Crosslinking Agents", Product Data Sheet, 2000, 2 pages.
"ESCOR EAAA Copolymers", MSDS, ExxonMobil Chemical Company, Nov. 25, 2019, 13 pages.
"Licocene PP MA 6452 Granules", Product Data Sheet, Clariant Additives, Sep. 12, 2017, 2 pages.
Laney, "Elastic Modulus of Poly(ethylene-co-acrylic acid) Copolymers and Ionomers: Effects of Temperature and Relative Humidity", BS Thesis, Princeton University, May 2010, 46 pages.
"New Reactive Surfactant Adeka Reasoap ER/SR Series," Surface Active Agents, Technical Information, ADEKA Amazing Chemicals, ADEKA Corporation, 8 pages (2011).
Application and File History for U.S. Appl. No. 17/720,928, dated Apr. 14, 2022, Inventors: O'Brien, et al., 107 pages.
Extended European Search Report for EP Application No. EP 17783149.2, dated Nov. 29, 2019, 7 pages.
Office Action for Japanese Patent Application No. 2018-553140 dated Feb. 12, 2021, 6 pages.
Surfactants Products List, Surface Active Agents, ADEKA Amazing Chemicals, ADEKA Corporation, 16 pages (2013).
"ALLNEX—Phenolic Resins", Product Guide, Phenodur resins, Woridwide (2017), 7 pages.
"CYTEC—Liquid Coating Resins", Product Guide, Asia Pacific, 2006, 15 pages.
"The Organic Chemistry of Sugars", D.E. Levy and P. Fugedi (ed.), pp. 227-231, CRC Press, 2006.
European Patent Office, Notice of Opposition, for EP Application No. 17867591.4, dated Sep. 5, 2022, 14 pages.

* cited by examiner

ACRYLIC POLYMERS AND COMPOSITIONS CONTAINING SUCH POLYMERS

CROSS REFERENCE TO RELATED APPLICATIONS

This application is a national stage filing under 35 U.S.C. § 371 of International Application No. PCT/US2018/032134 filed May 10, 2018 and entitled "ACRYLIC POLYMERS AND COMPOSITIONS CONTAINING SUCH POLYMERS", which is a Continuation-in-part of and claims the benefit of International Application No. PCT/US2017/57432 filed Oct. 19, 2017 and entitled "ACRYLIC POLYMERS AND COMPOSITIONS CONTAINING SUCH POLYMERS", the disclosures of both of which are incorporated herein by reference in their entirety. This application is also a Continuation-in-part of application Ser. No. 16/342,873 filed Apr. 17, 2019 and entitled "ACRYLIC POLYMERS AND COMPOSITIONS CONTAINING SUCH POLYMERS" which is a national stage filing under 35 U.S.C. § 371 of the above-mentioned International Application No. PCT/US2017/57432 and which claims the benefit of Provisional Application Ser. No. 62/410,255 filed Oct. 19, 2016 and entitled "STYRENE-FREE ACRYLIC POLYMERS AND COMPOSITIONS CONTAINING SUCH POLYMERS".

BACKGROUND

There is a desire to reduce or eliminate the use of certain bisphenol A-derived polymers in food or beverage container coatings. Although a number of replacement coating compositions made without bisphenol A have been proposed, some replacement compositions have exhibited insufficient coating properties such as insufficient corrosion resistance on metal substrates, insufficient flexibility or insufficient toughness.

Coatings for use on food or beverage containers should avoid unsuitably altering the taste of the packaged food or beverage products, and should also avoid flaking or chipping into the packaged products. The coatings should also resist chemically aggressive food or beverage products (which can have a complex chemical profile, including salts, acids, sugars, fats, etc.) for extended periods of time (e.g., years). Food or beverage container coatings should also have good adhesion to the underlying substrate and remain sufficiently flexible after curing to survive subsequent fabrication or denting during transportation, storage or use that causes the metal substrate to deform and the coating to flex. Some brittle coatings have been observed to crack during flexure, thereby exposing the container metal to the packaged products, which can cause corrosion, contamination of the packaged product and even leakage or rupture of the container. Even a low probability of coating failure may cause a significant number of containers to leak, given the large number of manufactured food and beverage containers.

Accordingly, it will be appreciated that what is needed in the art are improved coating compositions that are made without intentionally using bisphenol A, but which exhibit the stringent balance of coating properties to permit the use of such coating compositions on food or beverage containers.

SUMMARY

In one aspect, the invention provides a food or beverage container at least a portion of which is coated with a coating composition comprising (a) a crosslinkable carboxyl-functional acrylic polymer made by polymerizing monomers including acidic monomer, multi-ethylenically unsaturated monomer and optional styrene or substituted styrene, and (b) a nitrogen-containing carboxyl-reactive crosslinking agent (viz., an "NCCR crosslinker"). In preferred embodiments, the acrylic coating is a latex polymer made by emulsion-polymerizing monomers including acidic monomer, multi-ethylenically unsaturated monomer and optional styrene or substituted styrene. In further preferred embodiments, the disclosed coating composition exhibits sufficient flexibility when cured to be suitable for use as an interior or exterior coating on an aluminum beverage can and to resist fracture or delamination when the filled can is dropped. The compositions may be crosslinked to form a cured, hardened film without requiring the presence of a phosphorus acid, such as has been used in some previously-reported coating compositions containing a hydroxyalkylamide or hydroxyalkylurea crosslinking agent. Curing instead appears to be facilitated by using sufficient acidic monomer and sufficient multi-ethylenically unsaturated monomer to make the disclosed acrylic polymer.

In another aspect, the invention provides an article having a metal substrate, wherein at least a portion of the metal substrate has a cured coating disposed thereon formed from a coating composition comprising (a) a crosslinkable carboxyl-functional acrylic polymer made by polymerizing monomers including acidic monomer, multi-ethylenically unsaturated monomer and optional styrene or substituted styrene, and (b) an NCCR crosslinker. In some embodiments, the article is a food or beverage can or a portion thereof. In certain preferred embodiments, the article is an aluminum beverage can having an inside spray coating disclosed herein on an interior surface.

In yet another aspect, the invention provides a method of coating a food or beverage can, or a portion thereof, including (i) receiving a coating composition comprising (a) a crosslinkable carboxyl-functional acrylic polymer made by polymerizing monomers including acidic monomer, multi-ethylenically unsaturated monomer and optional styrene or substituted styrene, (b) an NCCR crosslinker, and (c) a liquid carrier that includes one or both of water and an organic solvent, and (ii) applying the coating composition on a metal substrate prior to, or after, forming the metal substrate into a food or beverage can or a portion thereof. In some embodiments, the method includes spray applying the coating composition to an interior portion of a food or beverage can.

In yet another aspect, the invention provides a coating composition comprising (a) a crosslinkable carboxyl-functional acrylic polymer made by polymerizing monomers including acidic monomer, multi-ethylenically unsaturated monomer and optional styrene or substituted styrene, (b) an NCCR crosslinker, and (c) a liquid carrier that includes one or both of water and an organic solvent. In preferred embodiments, the disclosed polymer is a latex polymer made by emulsion-polymerizing monomers including acidic monomer, multi-ethylenically unsaturated monomer and optional styrene or substituted styrene. In further preferred embodiments, the disclosed coating composition is suitable for use in forming a food-contact coating of a metal food or beverage can.

In some embodiments, the disclosed acrylic polymer is made using at least about 1 weight % styrene, based on the total weight of monomers used to make the acrylic polymer.

In some embodiments, the acrylic polymer has a glass transition temperature of greater than about 40° C. or greater than about 50° C., and up to about 100° C. or up to about 80° C. In additional embodiments, the acrylic polymer is formed from ingredients including an ethylenically unsaturated monomer component that includes one or both of a monomer having a cyclic group or a monomer having a branched organic group.

In some embodiments, the coating composition exhibits an elongation at break of at least 1% when suitably cured and tested as a free film.

In some embodiments, the disclosed composition includes one or more additional crosslinkers, such as a polyisocyanate, aminoplast resin or phenolic resin crosslinker.

In some embodiments, the coating composition is substantially free of or does not contain a phosphorus acid, and in some embodiments the coating composition contains less than 5 weight %, less than 2 weight % or less than 1 weight % phosphorus acid.

In preferred embodiments, the disclosed coating composition is substantially free of bisphenol A and epoxides thereof. In additional preferred embodiments, the acrylic coating composition is also substantially free of each of halogenated monomers, bisphenol F, bisphenol S, and epoxides thereof.

In further preferred embodiments, the disclosed coating composition, when spray applied onto an interior of a standard 12-ounce two-piece drawn and ironed aluminum 211 diameter beverage can at a dry film weight of 120 milligrams per can and cured at an oven temperature of at least 188° C. to achieve a dome peak temperature of at least 199° C., gives a metal exposure of less than 20 mA, less than 10 mA, or less than 3.5 mA when tested pursuant to the Metal Exposure after Drop Damage test disclosed herein.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as limiting or as an exclusive list.

The details of one or more embodiments of the invention are set forth in the description below. Other features, objects, and advantages of the invention will be apparent from the description and from the claims.

Selected Definitions

Unless otherwise specified, the following terms as used herein have the meanings as provided below.

As used herein, "a," "an," "the," "at least one," and "one or more" are used interchangeably. Thus, for example, a coating composition that includes "a" surfactant can include "one or more" surfactants.

The terms "acrylate" and "acrylic" are used broadly (and interchangeably) herein and encompass materials prepared from, for example, one or more of acrylic acid, methacrylic acid, or any acrylate or methacrylate compound. Thus, for example, a homopolymer consisting entirely of polymerized (meth)acrylic acid would still be an "acrylate" polymer even though no (meth)acrylate monomer was employed.

The term "branched alkyl group" refers to an alkyl group, which optionally includes one or more heteroatoms (e.g., O, N, P, Si, etc.), that includes at least one carbon-containing substituent group in place of a hydrogen (e.g., —CR$_3$, —O—CR$_3$, —NH—C(O)—O—CR$_3$ and the like where each R is as described above). The term "branched alkyl moiety" refers to a branched alkyl group that does not include any heteroatoms.

The term "branched organic group" refers to a carbon-containing group that has a branching atom (e.g., carbon, nitrogen, silicon, or phosphorus) that is attached to at least three other atoms other than hydrogen, more typically at least three carbon-containing groups (e.g., —CR$_3$, —OCR$_3$, —NH—C(O)—O—CR$_3$, and the like, where each R is independently any suitable atom or group such as a halogen, a hydrogen, an organic group, or a non-carbon-containing group (e.g., —OH, —NH$_2$, etc.)), and even more typically at least three carbon atoms of at least three carbon-containing groups.

The terms "comprises" and variations thereof do not have a limiting meaning where these terms appear in the description and claims.

The term "ethylenically unsaturated" refers to a carbon-carbon double or triple bond capable of participating in a free-radical initiated polymerization reaction, and is not intended to encompass the carbon-carbon double bonds present in aryl groups such as, for example, the phenyl group of styrene. Thus, for example, dodecyl benzene sulfonic acid is not considered to include an ethylenically unsaturated group.

The terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. The term "group" also encompasses single atom moieties. Thus, for example, a halogen atom can be a group. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety. A group or moiety that may be the same or different is referred to as being "independently" something.

The term "(meth)" as used in "(meth)acrylate", "(meth) acrylic acid", and the like is intended to indicate that either a hydrogen or methyl group may be attached to the pertinent carbon atom of the monomer. For example "ethyl (meth) acrylate" encompasses both ethyl acrylate and ethyl methacrylate, as well as mixtures thereof.

The term "monomer" includes any reactant molecule used to produce a polymer, and encompasses both single-unit molecules (e.g., an acrylic molecule) and multi-unit molecules (e.g., an acrylic oligomer).

The term "on" when used in the context of a coating applied on a surface or substrate, includes both coatings applied directly or indirectly to the surface or substrate. Thus, for example, a coating applied to a primer layer overlying a substrate constitutes a coating applied on the substrate.

The term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

Unless otherwise indicated, the term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyether-acrylate copolymers).

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "styrene-free" indicates that styrene was not intentionally used, although trace amounts of contaminating styrene may be present (e.g., due to environmental contamination).

The term "substantially free" when used with respect to a coating, coating composition, polymer or other composition that may contain a particular compound means that the referenced composition contains less than 1,000 parts per million (ppm) by weight of the recited compound whether the compound is mobile in the composition or bound to a constituent of the composition (e.g., as a structural unit of a polymer). The term "essentially free" when used with respect to a coating, coating composition, polymer or other composition that may contain a particular compound means that the referenced composition contains less than 100 ppm by weight of the recited compound. The term "essentially completely free" when used with respect to a coating, coating composition, polymer or other composition that may contain a particular compound means that the referenced composition contains less than 5 ppm by weight of the recited compound. The term "completely free" when used with respect to a coating, coating composition, polymer or other composition that may contain a particular compound means that the referenced composition contains less than 20 parts per billion (ppb) by weight of the recited compound. When the phrases "free of" (outside the context of the aforementioned phrases), "does not include any" and the like are used herein, such phrases are not intended to preclude the presence of trace amounts of the pertinent structure or compound which may be present, e.g., as environmental contaminants. The recited quantities may be determined using the Global Extraction test described below.

When used with respect to an acrylic polymer made using one or more ethylenically unsaturated monomers (viz., an ethylenically unsaturated component) in the presence of a polymerizable or polymeric surfactant (e.g., when making an acrylic latex polymer), the term "weight of monomers used to make the acrylic polymer" refers to the total (viz., combined) weight of monomers used to make the acrylic polymer including those in the ethylenically unsaturated component and those in or used to make the polymerizable or polymeric surfactant.

The recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

Unless otherwise indicated, all parts and percentages are by weight.

DETAILED DESCRIPTION

The present invention provides an acrylic coating composition that provides a good balance of coating properties for food and beverage container coatings. Such properties include, for example, good adhesion, good flexibility, and good corrosion resistance. In some embodiments, the coating composition is formulated using an acrylic polymer made from monomers including styrene or a substituted styrene compound. In other embodiments, the coating composition is formulated using an acrylic polymer that is styrene-free, viz., free of styrene and substituted styrenes.

Acrylic can coatings have often suffered from flexibility problems and have generally been regarded as relatively inflexible as compared to other can coatings such as bisphenol-A-based epoxy can coatings. The relative inflexibility of acrylic resin systems tends to worsen with increasing Tg and, therefore, most conventional "high" Tg acrylics are unsuitable for use in can coatings, including inside spray beverage can coatings, due to having insufficient flexibility for the desired end use. Moreover, omitting styrene from such "high" Tg acrylics further exacerbates the flexibility problems. The use of "high" Tg acrylic polymers, however, can be beneficial for purposes of achieving one or both of (i) decreased flavor scalping by the cured coating and (ii) enhanced chemical resistance by the cured coating. Enhanced chemical resistance can be aided by attaining good crosslink density in the cured coating, as manifested for example by improved resistance to solvent removal in the Solvent Resistance test described below. In a composition that will be cured using an NCCR crosslinker, the addition of a phosphorus acid can improve resistance to solvents including methyl ethyl ketone (MEK). Surprisingly, compositions of the invention can provide cured coatings with a desirable combination of properties, including good solvent resistance, without requiring the use of a phosphorus acid. Without intending to be bound by theory, it is believed that the use of sufficient acidic monomer and sufficient multi-ethylenically unsaturated monomer to form the latex polymer may provide improved crosslink density in compositions crosslinked using an NCCR crosslinker. Without intending to be bound by theory, it is also believed that some of this improvement in crosslink density may be in the form of increased intra-particle crosslinking (viz., increased crosslinking within latex particles) rather than being due mainly or entirely to increased inter-particle crosslinking (viz., increased crosslinking between latex particles).

Particularly preferred acrylic coating compositions of the present invention are capable of simultaneously exhibiting good adhesion, good flexibility (e.g., sufficient flexibility for use as an inside spray coating of a drawn and ironed aluminum beverage can), good corrosion resistance, and reduced flavor scalping, while providing a "high" Tg cured film (e.g., an acrylic polymer film having a Tg >40° C. or >60° C.).

In the discussion that follows, emphasis is placed on acrylic latexes and latex-based coatings. It should be understood, however, that the teachings and disclosure contained herein may also be applied to acrylic polymers, and especially styrene-free acrylic polymers, that are not latexes and acrylic coatings that are not latex-based. Examples of such acrylic polymers that may not be latexes include organic-solution polymerized acrylics, which may or may not be water-dispersible.

While not intending to be bound by theory, it is also believed that enhanced elongation at break properties can correlate to improved flexibility in food or can coating end uses, and particularly to improved flexibility for inside spray beverage can coatings. Assuming that other requisite coating properties are present (e.g., suitable coating adhesion), it is believed that a suitably high elongation at break can correlate to suitable coating flexibility in end use specific food or beverage can coating tests such as the "Metal Exposure after Drop Damage" test described herein.

While it is contemplated that the disclosed coatings can exhibit any suitable elongation at break values, in some embodiments, the coatings, when evaluated as suitable cured free films, preferably exhibit an elongation at break percent of at least 1%, more preferably at least 1.5%, even more preferably at least 2%, and even more preferably at least 3%. In some embodiments, the elongation at break of the coating compositions, when evaluated as suitable cured free films, are greater than 5%, greater than 10%, and in some instances even 15% or more (e.g., ≥15%, ≥20%, or ≥30%). The elongation at break is not restricted on the upper end, but may be, for example, less than 100%, 80%, 50%, 40%, 30%, or 20%. A suitable methodology for assessing elongation at break is discussed below.

While not wishing to be bound by any theory, it is also believed that the beneficial effects of increased intra-particle crosslink density discussed above may be augmented by adding certain additional monomers that could provide internal crosslinking moieties in the polymer particles. For example, the use of monomers such as allyl methacrylate and glycidyl methacrylate may be useful in creating such intra-particle crosslinks.

The disclosed acrylic polymer is preferably a free-radical polymerized polymer formed from ingredients including various ethylenically unsaturated monomers, which may be polymerized in one or more stages, and which stages may have the same or a different monomer composition. More preferably, the polymer is an acrylic polymer such as, for example, an organic solution polymerized acrylic polymer (which may optionally be water-dispersible) or an acrylic latex polymer, and more preferably an acrylic latex polymer that may optionally include a water-dispersible polymer such as, for example, a water-dispersible organic solution polymerized acrylic polymer. In a preferred embodiment, the polymer is a latex polymer formed by emulsion polymerizing an ethylenically unsaturated monomer component in an aqueous medium. The resulting latex polymer can be a single-stage latex or a multi-stage latex. The ethylenically unsaturated monomer component is typically emulsion polymerized in the aqueous medium in the presence of at least one surfactant (or emulsifier), which can be polymeric, non-polymeric, or a blend thereof.

The disclosed latex polymer may be of any suitable molecular weight. In some embodiments, the latex polymer has a number average molecular weight ($M_n$) of at least about 30,000, at least about 100,000, at least about 200,000, or at least about 300,000. The upper range of the $M_n$ of the latex polymer is not restricted and may be 1,000,000 or more. In certain embodiments, however, the $M_n$ of the latex polymer is less than about 1,000,000, less than about 600,000, or less than about 400,000. Molecular weight measurements may be made using methods that will be familiar to persons having ordinary skill in the art, such as via gel permeation chromatography (GPC) analysis using polystyrene standards. For embodiments in which the molecular weight may be too high to measure using methods such as GPC, it may be necessary to determine the number average molecular weight via theoretical calculation.

Preferably, at least 5 weight %, more preferably at least 25 weight %, even more preferably at least 40 weight %, even more preferably at least 50 weight %, and even more preferably at least 55 weight % or at least 60 weight % of the ethylenically unsaturated monomer component is used in making the latex polymer. In some embodiments, the ethylenically unsaturated monomer component may represent up to about 100 weight %, up to 98 weight %, up to 95 weight %, up to 80 weight %, or up to 70 weight % of the latex polymer. Such percentages are based on weight of monomers used to make the acrylic polymer as defined above.

In embodiments in which a water-dispersible polymer is used to facilitate emulsion polymerization of the latex polymer (e.g., as a "polymeric surfactant"), preferably no greater than 95 weight %, more preferably no greater than 90 weight %, and even more preferably no greater than 85 weight % of the ethylenically unsaturated monomer component is used in making the latex polymer. Such percentages are based on the total weight of the ethylenically unsaturated monomer component and the water-dispersible polymer used to make the latex.

The ethylenically unsaturated monomer component preferably is a mixture of monomers including one or more acidic monomers and one or more multi-ethylenically unsaturated monomers. As discussed in more detail below, the ethylenically unsaturated monomer component may also include styrene, one or more substituted styrenes, one or more monoethylenically unsaturated (meth)acrylate monomers (e.g., "linear" alkyl (meth)acrylates), one or more branched or cyclic (meth)acrylate monomers and, optionally one or more other ethylenically unsaturated monomers.

The disclosed acidic monomers may include a variety of acid- or anhydride-functional monomers, or salts thereof, with their selection being dependent on the desired final polymer properties. Preferably, such monomers are ethylenically unsaturated, more preferably, alpha, beta-ethylenically unsaturated. Suitable ethylenically unsaturated acid- or anhydride-functional monomers include monomers having a reactive carbon-carbon double bond and an acidic or anhydride group, or salts thereof. Preferred such monomers have from 3 to 20 carbons, at least 1 site of unsaturation, and at least 1 acid or anhydride group, or salt thereof.

Suitable acid-functional monomers include ethylenically unsaturated monobasic and dibasic acids, as well as anhydrides and monoesters of dibasic acids. The selected monomers preferably are readily copolymerizable with any other monomer(s) used to prepare the disclosed acrylic polymer. Illustrative acid-functional monomers include those represented by the below Formula (I):

$$CH_2=C(R)-COOH \qquad (I)$$

where R is hydrogen or an alkyl group of 1 to 6 carbon atoms, and more typically hydrogen or methyl ($-CH_3$).

Examples of readily available ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, or mixtures thereof. Preferred unsaturated acid-functional monomers include acrylic acid, methacrylic acid, crotonic acid, fumaric acid, maleic acid, 2-methyl maleic acid, itaconic acid, 2-methyl itaconic acid, and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof. If desired, aqueous salts of the above acids may also be employed.

Examples of suitable ethylenically unsaturated anhydride monomers include compounds derived from the above acids (e.g., as a pure anhydride or mixtures of such). Preferred anhydrides include acrylic anhydride, methacrylic anhydride, and maleic anhydride.

In some embodiments, the disclosed acrylic polymer is made from a mixture of monomers including at least 1 weight %, at least 2 weight %, at least 3 weight %, at least 4 weight % or at least 5 weight % of acid-functional monomers based on the total weight of monomers used to make the acrylic polymer, with amounts greater than 5 weight % being preferred. In some embodiments, the disclosed acrylic polymer is made from a mixture of monomers including up to about 50 weight %, up to about 40 weight %, up to about 30 weight % or up to about 20 weight % of acid-functional monomers based on the total weight of monomers used to make the acrylic polymer.

The disclosed multi-ethylenically unsaturated monomers may include a variety of monomers containing two or more sites of ethylenic unsaturation. Multi-ethylenically-unsaturated (meth)acrylates are preferred. Examples of multi-ethylenically unsaturated (meth)acrylates include polyhydric alcohol esters of acrylic acid or methacrylic acid, such as ethanediol di(meth)acrylate, propanediol di(meth)acrylates (e.g., 1,2-propanediol di(meth)acrylate and 1,3-propanediol di(meth)acrylate), butanediol di(meth)acrylates (e.g., 1,3-butanediol di(meth)acrylate and 1,4-butanediol di(meth)acrylate), heptanediol di(meth)acrylate, hexanediol di(meth)acrylate, trimethylolethane tri(meth)acrylate trimethylolpropane tri(meth)acrylate, trimethylolbutane tri(meth)acrylate, trimethylolheptane tri(meth)acrylate, trimethylolhexane tri(meth)acrylate, tetramethylol methane tetra (meth)acrylate, dipropylene glycol di(meth)acrylate, trimethylol hexane tri(meth)acrylate, pentaerythritol tetra (meth)acrylate, isosorbide di(meth)acrylate, allyl (meth) acrylate, glycerol dimethacrylate, isomers thereof, and mixtures thereof. Examples of other multi-ethylenically-unsaturated monomers include diallyl phthalate, divinylbenzene, divinyltoluene, divinylnaphthalene, and mixtures thereof. In one preferred embodiment, 1,4-butanediol di(meth)acrylate is included in the ethylenically unsaturated monomer component.

In some embodiments, the ethylenically unsaturated monomer component includes at least 1 weight %, at least 1.5 weight %, at least 2 weight %, at least 2.5 weight %, at least 3 weight %, at least 3.5 weight %, at least 4 weight %, at least 5 weight %, at least 6 weight %, at least 7 weight %, at least 8 weight % or at least 9 weight % multi-ethylenically unsaturated monomers based on the total weight of monomers used to make the acrylic polymer. In some embodiments, the disclosed acrylic polymer is made from a mixture of monomers including less than about 30 weight %, more typically less than about 25 weight %, and even more typically less than about 20 weight % or less than about 17.5 weight % multi-ethylenically unsaturated monomers based on the total weight of monomers used to make the acrylic polymer. Acrylic polymers made from greater than 2 and up to about 10 weight % multi-ethylenically unsaturated monomers may provide in some embodiments a good balance of desirable viscosity for a dispersion or solution of the acrylic polymer and desirable flexibility and chemical resistance for the cured polymer film.

As discussed above, the disclosed acrylic polymer may optionally contain styrene or a substituted styrene compound. Exemplary substituted styrene compounds include alpha-methylstyrene, methyl styrenes (e.g., 2-methyl styrene, 4-methyl styrene, vinyl toluene, and the like), dimethyl styrenes (e.g., 2,4-dimethyl styrene), trans-beta-styrene, divinylbenzene, and the like. In some embodiments, the disclosed polymer is made from a mixture of monomers including at least about 1 weight %, at least about 5 weight %, at least about 10 weight %, at least about 15 weight % or at least about 30 weight %, and up to about 70 weight %, up to about 60 weight %, up to about 50 weight %, up to about 40 weight % or up to about 35 weight % styrene or substituted styrenes based on the total weight of monomers used to make the acrylic polymer.

In addition to the acidic monomers, multi-ethylenically unsaturated monomers and optional styrene or substituted styrene, the disclosed acrylic polymer may be made from a variety of other monomers. For example, the ethylenically unsaturated monomer component may include a variety of monoethylenically-unsaturated (meth)acrylate monomers, including those having the below Formula (II):

$$CH_2=C(R^1)-CO-OR^2 \qquad (II)$$

wherein $R^1$ is hydrogen or methyl, and $R^2$ is an alkyl group preferably containing one to sixteen carbon atoms, a cycloaliphatic group, an aryl group, a silane group, or a combination thereof.

If desired, $R^2$ may optionally be substituted with one or more (e.g., one to three) moieties such as hydroxy, halo, phenyl, and alkoxy, for example. In preferred embodiments, the ethylenically unsaturated monomer component includes at least one "linear" alkyl (meth)acrylate having a linear (e.g., non-branched and non-cyclic) alkyl group. Examples of such linear groups include the following moieties: methyl, ethyl, n-propyl, n-butyl, n-pentyl, n-hexyl, etc. Preferred such monomers include one or more of methyl (meth)acrylate, ethyl (meth)acrylate, n-propyl (meth)acrylate, and n-butyl (meth)acrylate, with acrylate forms thereof being particularly preferred in certain embodiments. Examples of other suitable (meth)acrylates include pentyl (meth)acrylate, hexyl (meth)acrylate, octyl (meth)acrylate, nonyl (meth)acrylate, decyl (meth)acrylate, lauryl (meth) acrylate, hydroxyethyl (meth)acrylate, hydroxypropyl (meth)acrylate, and the like, and isomers and mixtures thereof.

In an embodiment, the ethylenically unsaturated monomer component includes one or more hydroxy-functional monoethylenically-unsaturated (meth)acrylates, such as hydroxyethyl (meth)acrylate, hydroxypropyl (meth)acrylate. Exemplary amounts of such hydroxy-functional monoethylenically-unsaturated (meth)acrylates are at least about 1 weight %, at least about 2 weight %, at least about 3 weight %, at least about 4 weight % or at least about 5 weight %, and up to about 25 weight %, up to about 20 weight %, up to about 18 weight %, up to about 15 weight % or up to about 12 weight %.

Typically, monoethylenically-unsaturated (meth)acrylates will constitute a substantial portion of the ethylenically unsaturated monomer component. In some embodiments, monoethylenically-unsaturated (meth)acrylates may constitute at least 20 weight %, at least 30 weight %, at least 40 weight %, at least 50 weight %, or at least 60 weight % or more of the ethylenically unsaturated monomer component based on the total weight of monomers used to make the acrylic polymer. In some embodiments, the ethylenically unsaturated monomer component includes at least 10 weight %, at least 15 weight %, or at least 20 weight % of one or more linear alkyl (meth)acrylates based on the total weight of monomers used to make the acrylic polymer. When present, linear alkyl (meth)acrylates preferably constitute less than 70 weight %, more preferably less than 60 weight %, and even more preferably less than 50 weight % of the ethylenically unsaturated monomer component based on the total weight of monomers used to make the acrylic polymer.

The disclosed acrylic polymer may as mentioned above be made from monomers including one or more branched or cyclic monomers. Such monomers may for example be used in place of styrene or may be used to reduce the amount of styrene. For brevity, an ethylenically unsaturated monomer having a branched organic group will be referred to as a "branched monomer" and an ethylenically unsaturated monomer having a cyclic group will be referred to as a "cyclic monomer." Ethylenically unsaturated monomers that, when incorporated into the acrylic polymer, do not provide a pendant branched group, will not be considered a branched monomer. Thus, as used herein, methyl methacrylate is not considered to be a branched monomer because it does not provide a pendant branched group when incorporated into an acrylic polymer. Stated in another way, methyl methacrylate is not considered to be a branched monomer because it does not provide a pendant group having at least one branching atom that is not present in the polymer backbone.

In some embodiments, the ethylenically unsaturated monomer component used to form the acrylic polymer includes both one or more branched monomers and one or more cyclic monomers. Also, in some embodiments, the ethylenically unsaturated monomer component includes one or more monomers that include both a branched group and a cyclic group.

The branched or cyclic monomer may be any suitable monomer. Preferably, the monomer is capable of being incorporated into a polymer, such as, for example, an acrylic polymer, via a free-radical polymerization process. In some embodiments, the branched or cyclic monomer is a vinyl ester monomer.

Branched or cyclic monomers having any suitable Tg may be used. The selection of a branched or cyclic monomer having a particular Tg value may be influenced by a variety of factors including the end use of the coating composition (e.g., whether the coating is intended for an exterior or interior of a can) and the Tg of the other monomers selected. Typically, the branched or cyclic monomer will have a Tg greater than −10° C., more typically greater than 0° C.

In some embodiments, branched monomers having Tg values as low as about −3° C. (e.g., the VEOVA™ 10 monomer product commercially available from Hexion) or even as low as about −40° C. (e.g., the VEOVA 11 monomer product commercially available from Hexion) may be used. If used, such "low" Tg monomers will typically be used in combination with one or more "high" Tg monomers, such as one or more "high" Tg branched or cyclic monomers having a Tg greater than about 40° C.

In embodiments in which the branched or cyclic monomer is intended as at least a partial replacement for styrene, such as for an interior food-contact can coating, the branched or cyclic monomer preferably has a glass transition temperature ("Tg") that is sufficiently high to offset the replaced styrene. Thus, in some embodiments, the branched or cyclic monomer preferably has a Tg >40° C., more preferably >50° C., even more preferably >60° C., and optimally >70° C. Although the upper Tg is not restricted, in some embodiments, the branched or cyclic monomer has a Tg <110° C., <95° C., <85° C., or <75° C. For branched or cyclic monomers specifically referenced herein, any Tg values provided herein for such monomers should be used for comparison relative to the above Tg thresholds. For a branched or cyclic monomers not having a reported Tg value herein, in the absence of a reliable Tg value reported by a manufacturer of the monomer, the Tg of the monomer may be determined by making a homopolymer having a number average molecular weight of at least about 4,000 and a suitable polydispersity index (e.g., preferably less than 3 and ideally as low as possible) and measuring the Tg of the homopolymer using a suitable procedure such as the procedure included in the test methods section below.

A variety of cyclic monomers or combinations of cyclic monomers may be used including, for example, vinyl aromatic compounds other than styrene or substituted styrenes, vinyl alicyclic compounds, and combinations thereof. In some embodiments, the acrylic polymer is prepared from a mixture of monomers that is substantially free of vinyl aromatic compounds.

Exemplary cyclic monomers may include any suitable number of cyclic groups, which may be monocyclic groups or polycyclic groups and may be saturated or unsaturated. The atoms in the ring(s) of the one or more cyclic groups may be all carbon atoms or may include one or more heteroatoms (e.g., N, O, P, Si, etc.). Similarly, the rings may be of any suitable size and may, for example, include 3 to 13 atoms in the ring, more typically 4 to 9 atoms in the ring, and even more typically 4 to 6 atoms in the ring. In some embodiments, the ring of the cyclic group is a C4 ring (e.g., cyclobutane), a C5 ring (e.g., cyclopentane), or a C6 ring (e.g., cyclohexane). Cyclohexane groups, which may optionally include one or more substituents in place of hydrogen, are preferred cyclic groups in some embodiments.

Exemplary cyclic monomers include benzyl (meth)acrylate, cyclohexyl (meth)acrylate, isobornyl (meth)acrylate, phenyl (meth)acrylate, substituted variants thereof (e.g., 3,3,5-trimethylcyclohexyl (meth)acrylate and 4-tert-butylcyclohexyl (meth)acrylate), and mixtures thereof. Cyclohexyl methacrylate is a preferred cyclic monomer, and may be used to replace styrene in some embodiments.

A variety of branched monomers or combinations of branched monomers may be used. Preferred branched monomers include branched organic groups such as, for example, branched hydrocarbon groups, with branched alkyl groups being preferred in certain embodiments. The branched organic group may optionally include one or more heteroatoms (e.g., O, N, P, Si, etc.). In certain preferred embodiments, the branched organic group includes one or more, two or more, or even three or more branching atoms (preferably tertiary or quaternary carbon atoms). Although the branched organic group (inclusive of any carbon branching atoms) can include any suitable number of carbon atoms, typically it will include 3 or more, 4 or more, 5 or more, or 6 or more total carbon atoms. While the upper number of carbon atoms is not restricted, typically the branched organic group will include 18 or less, 13 or less, or 10 or less carbon atoms. If the branched organic group is connected to the ethylenically unsaturated group via a heteroatom-containing linkage (e.g., linkages including at least one or more heteroatoms such as N, O, P, S, etc.) the carbon atoms of the heteroatom-containing linkage are not counted as being part of the branched organic group. Examples of suitable heteroatom-containing linkages include, for example, those formed by reacting two complimentary reactive functional groups (e.g., —OH and —COOH) such as are used, for example, to produce condensation linkages and the like. Example of suitable heteroatom containing-linkages include amide, carbonate ester, ester, ether, urea, and urethane linkages. In some embodiments, the branched organic group is a branched $C_3$ to $C_{13}$ alkyl group or moiety, more preferably a branched $C_4$ to $C_{10}$ alkyl group or moiety.

The branched organic group may optionally include one or more cyclic groups. In some embodiments, the branched organic group includes one or more branching atoms (e.g., tertiary or quaternary carbon atoms) in a ring of the cyclic group or in a location other than the ring. Some examples of such compounds include 3,3,5-trimethylcyclohexyl (meth) acrylate (branching atom, in the form of a quaternary carbon atom, included in an aliphatic ring) and 4-tert-butylcyclohexyl (meth)acrylate (branching atom, in the form of quaternary carbon atom, attached to an aliphatic ring).

In some embodiments, the branched organic group (and optionally the branched monomer) does not include any cyclic groups. Thus, in some embodiments, the branched organic group is a branched, open-chain alkyl group (e.g., isopropyl, sec-butyl, isobutyl, tert-butyl, etc). Exemplary such branched monomers include isopropyl (meth)acrylate, isobutyl (meth)acrylate, isoamyl (meth)acrylate, 2-ethylhexyl (meth)acrylate and isodecyl (meth)acrylate.

In some embodiments, the ethylenically unsaturated monomer component includes one or more branched or cyclic monomers of the below Formula (III):

$$(R^3)_2\text{—}C\text{=}C(R^4)\text{—}W_m\text{—}Y \quad \text{(III)}$$

wherein:
R$^3$ is independently selected from hydrogen or an organic group;
R$^4$ is selected from hydrogen or an alkyl group;
W, if present, is a divalent linking group;
m is 0 or 1, more typically 1; and
Y is: (i) a branched organic group including one or more branching atoms, more typically one or more branching carbon atoms, (ii) a cyclic group (e.g., any of the cyclic groups disclosed herein), or (iii) a combination of (i) and (ii) (e.g., such as present in 4-tert-butylcyclohexyl (meth)acrylate).

The branched or cyclic monomer of Formula (III) can be either a vinyl monomer or an olefin monomer depending upon the R$^3$ and R$^4$ selections. In preferred embodiments, the monomer of Formula (III) is a vinyl monomer (e.g., a (meth)acrylate or vinyl ester) and both R$^3$ are hydrogen. In additional preferred embodiments, R$^4$ is hydrogen, a methyl moiety (—CH$_3$), or an ethyl moiety, more preferably hydrogen or a methyl moiety.

When present, W is typically a heteroatom-containing linkage such as, for example, any of those previously discussed. Examples of suitable such linkages include amide, carbonate, ester, ether, urea, and urethane linkages. Ester linkages of either directionality (—C(O)—O— or —O—C(O)—) are preferred such linkages. In some embodiments, W is an ester linkage and the carbonyl carbon of the ester is attached to a carbon atom of Y.

In some embodiments, Y is a branched organic group having the structure of the below Formula (IV):

$$\text{—}C(CH_3)_t(R^5)_{3-t} \quad \text{(IV)}$$

wherein:
t is 0 to 3;
each R$^5$, if present, is independently an organic group that may optionally be itself branched, more typically an alkyl group that may optionally include one or more heteroatoms (e.g., N, O, P, Si, etc.); and
two or more R$^5$ may optionally form a cyclic group with one another.

In some embodiments, t is 3. Tert-butyl acrylate and tert-butyl methacrylate are two examples of a branched monomer of Formula (III) in which "Y" has a structure of Formula (IV) and t is 3.

In some embodiments, t is 1 and the total number of carbon atoms present in both R$^5$ groups is 6, 7, or 8. Examples of such branched monomers include the VEOVA 9 (Tg 70° C.), VEOVA 10 (Tg −3° C.), and VEOVA 11 (Tg −40° C.) monomers commercially available from Hexion.

In some embodiments in which the monomer of Formula (III) includes a Y group of Formula (IV), t is 0, 1, or 2, and Y includes at least one R$^5$ group that is itself a branched organic group, more typically a branched alkyl group. Thus, for example, in some embodiments, at least one R$^5$ is present that includes a tertiary or quaternary carbon atom. The VEOVA 9 monomer is an example of such a branched monomer.

Additional examples of suitable branched monomers may include isopropyl methacrylate, isobutyl methacrylate, sec-butyl methacrylate, and mixtures thereof.

In certain preferred embodiments, Y includes at least one carbon atom that functions as a branching point (e.g., the leftmost carbon atom depicted in Formula (IV)). Nonetheless, it is contemplated that the branched organic group may include branching atom(s) other than carbon such as, for example, P, Si, or N. Such a branching heteroatom may be used in place of, or in addition to, a branching carbon atom in Y.

In some embodiments, the branched organic group is provided by neodecanoic acid or neononanoic acid. In one embodiment, the branched monomer is a vinyl ester of neodecanoic acid or neononanoic acid.

The amount of branched or cyclic monomer employed can vary depending upon a variety of factors such as, for example, the other monomer(s) present, the desired Tg, and the desired end use including, e.g., the desired amount of coating flexibility or corrosion resistance. In some embodiments, one or both of: (i) the ethylenically unsaturated monomer component or (ii) an acrylic-containing resin system formed, at least in part, from the ethylenically unsaturated monomer component (e.g., a latex formed by emulsion polymerizing the ethylenically unsaturated component in the presence of a water-dispersible polymer) includes at least 10 weight percent ("weight %"), more preferably at least 20 weight %, even more preferably at least 30 weight %, and in some embodiments 40 weight % or more of one or more branched or cyclic monomers based on the total weight of monomers used to make the acrylic polymer. Although the upper amount of branched or cyclic monomers is not restricted, typically the ethylenically unsaturated monomer component will include less than 90 weight %, more typically less than 70 weight %, more typically less than 60 weight %, and even more typically less than 50 weight % of one or more branched or cyclic monomers based on the total weight of monomers used to make the acrylic polymer. In some such embodiments, one or more branched monomers are present in an above recited amount, while either no cyclic monomers are present or one or more cyclic monomers are present in an additional amount. In some such embodiments, one or more cyclic monomers are present in an above recited amount, while either no branched monomers are present or one or more branched monomers are present in an additional amount.

In some embodiments in which the polymer is an emulsion polymerized latex, the overall latex particle or polymer preferably includes an amount of one or more branched or cyclic monomers pursuant to the amounts disclosed in the preceding paragraph. For example, in certain embodiments where the ethylenically unsaturated monomer component is polymerized in the presence of a water-dispersible acrylic polymer (e.g., an acid- or anhydride-functional organic solution polymerized acrylic polymer), the overall latex particle or polymer includes an amount of one or more branched or cyclic monomers in such amounts.

It is contemplated that, in some embodiments, the ethylenically unsaturated monomer component may not include one or more branched or cyclic monomers, but rather, may include a reactive functional group through which a branched or cyclic organic group may be subsequently grafted. For example, a polymer having pendant reactive groups could be post-modified with a branched or cyclic reactive compound (e.g., a compound including a "Y" branched or cyclic group and a reactive functional group capable of forming a "W" divalent linkage) to include one or more branched organic groups disclosed herein. For example, the hydroxyl groups of a latex polymer could be reacted with neodecanoic acid or neononanoic acid to provide branched organic groups thereon.

In some embodiments, the ethylenically unsaturated monomer component includes, if any, less than 20 weight %, less than 10 weight %, less than 5 weight % or less than 1 weight % of vinyl aromatic compounds. In some embodiments, the ethylenically unsaturated monomer component, and preferably the final polymer, is substantially free of such compounds. Also, in presently preferred embodiments, the ethylenically unsaturated monomer component, and preferably the final polymer, does not include any acrylamide-type monomers (e.g., acrylamides or methacrylamides).

In some embodiments, the ethylenically unsaturated monomer component includes at least one oxirane-functional monomer, more preferably at least one oxirane-functional alpha, beta-unsaturated monomer. Suitable oxirane-functional monomers include monomers having a reactive carbon-carbon double bond and an oxirane (viz., a glycidyl) group. Typically, the monomer is a glycidyl ester of an alpha, beta-unsaturated acid, or anhydride thereof (viz., an oxirane group-containing alpha, beta-ethylenically unsaturated monomer). Suitable alpha, beta-unsaturated acids include those discussed above in connection with the acidic monomer.

Exemplary monomers containing a glycidyl group include glycidyl (meth)acrylate (viz., glycidyl methacrylate and glycidyl acrylate), mono- and di-glycidyl itaconate, mono- and di-glycidyl maleate, mono- and di-glycidyl formate, allyl glycidyl ether and vinyl glycidyl ether. Preferred monomers include glycidyl acrylate and glycidyl methacrylate ("GMA"), with GMA being particularly preferred in some embodiments.

In some embodiments, the ethylenically unsaturated monomer component includes more than 1 weight %, more than 2 weight %, more than 3 weight %, or 5 or more weight % of oxirane-group containing monomer. The ethylenically unsaturated monomer component preferably contains no greater than 30 weight %, more preferably no greater than 20 weight %, even more preferably no greater than 10 weight %, and optimally no greater than 9 weight % of the oxirane group-containing monomer.

In embodiments in which the ethylenically unsaturated monomer component includes an oxirane-functional monomer, it may be advantageous to employ an amine, more preferably a tertiary amine, in preparing the latex or other acrylic polymer. Without intending to be bound by theory, under preferred conditions an acid group (e.g., present in the acidic monomer or in a separately-provided water-dispersible polymer), an oxirane group, and an amine (particularly a tertiary amine) are believed to form a quaternary salt linkage. This linkage is favored, as it not only links polymer chains together but also promotes water dispersibility of the joined polymer and can enhance the mechanical properties of a coating composition including the polymer. It should be noted that an acid group and an oxirane group may also form an ester. Some of this reaction is possible, though this linkage is less desirable when water dispersibility is sought. In some embodiments, the ethylenically unsaturated monomer component does not include any monomers having oxirane groups.

The ethylenically unsaturated monomer component may also include other suitable monomers. For example, suitable other ethylenically unsaturated monomers (e.g., olefinic or vinyl monomers other than (meth)acrylates) may include isoprene, diallylphthalate, conjugated butadiene, vinyl naphthalene, acrylonitrile, (meth)acrylamides (e.g., acrylamide, methacrylamide, N-isobutoxymethyl acrylamide, N-butoxymethyl acrylamide, etc.), methacrylonitrile, vinyl acetate, vinyl propionate, vinyl butyrate, vinyl stearate, and the like, and variants and mixtures thereof.

As discussed above, the disclosed coating compositions also contain an NCCR crosslinker. The inventors have surprisingly discovered that acrylic coating compositions, including compositions having a relatively "high" Tg (e.g., a Tg greater than 60° C.), and containing an acrylic polymer made by polymerizing monomers including acidic monomer, multi-ethylenically unsaturated monomer and cross-linked with an NCCR crosslinker, can provide acrylic food or beverage can coatings with substantially improved flexibility. This was surprising because conventional cross-linkers used in can coatings are generally not capable of providing large improvements in coating flexibility when used to formulate acrylic coatings. Consistent with this, the substantial improvement in coating flexibility was not observed for other more conventional crosslinkers. For example, resole phenolic crosslinkers, which are often used to formulate acrylic can coatings, were not capable of yielding a comparable flexibility improvement. In addition, the use of NCCR crosslinkers such as, e.g., hydroxyalkylamide or hydroxyalkylurea crosslinkers, allows for production of a formaldehyde-free acrylic coating composition having sufficient flexibility for use as an interior or exterior coating of a food or beverage can.

The disclosed NCCR crosslinker can have any suitable combination of one or more carboxyl-reactive functional groups, and more preferably includes two or more such groups. Hydroxyl groups are preferred carboxyl-reactive groups. Other suitable carboxyl-reactive groups may include thiol groups. In some embodiments, the NCCR crosslinker includes two or more, three or more, or four or more hydroxyl groups.

The NCCR crosslinker can include any suitable number of nitrogen atoms, although it will typically include two or more nitrogen atoms, and, in some embodiments, two total nitrogen atoms. In some embodiments, one or more (and more preferably two or more) nitrogen atoms are present in an amide group, an aziridine group, an imide group, a diimide group, an oxazoline group, a urethane group, or a combination thereof. In a preferred embodiment, the NCCR crosslinker includes two or more amide groups. It is contemplated, however, that the NCCR crosslinker may contain a single amide group such as, for example, a poly-substituted amide group having two or more hydroxyl groups.

In certain preferred embodiments, the NCCR crosslinker includes one or more, and more preferably two or more, groups having the structure of the below Formula (V):

wherein:
each $R^6$ is independently an organic group, and
each $R^7$ is independently hydrogen or an organic group.

As shown in Formula (V), the depicted hydroxyl group can be a primary hydroxyl group, secondary hydroxyl group, or tertiary hydroxyl group depending on the structure of $R^6$. In some embodiments, the hydroxyl group is a primary hydroxyl group.

$R^6$ can include any suitable number of carbon atoms, but will typically include from 2 to 10 carbons atoms, more typically from 2 to 8 carbon atoms, more typically from 2 to 6 carbons atoms, and even more typically from 2 to 4 carbon atoms. $R^6$ will typically include at least two carbon atoms in a chain connected on one end to the depicted nitrogen atom and on the other end to the depicted hydroxyl group. In an embodiment, the depicted hydroxyl group is attached directly to a first carbon atom, which is attached directly to a second carbon, which is in-turn attached directly to the depicted nitrogen atom. In some embodiments $R^6$ is $-(CH_2)_2-$.

In some embodiments, $R^6$ is an alkylene group preferably containing from 1 to 5 carbon atoms (e.g., methylene, ethylene, n-propylene, sec-propylene, n-butyl, sec-butylene, tert-butylene, pentylene, etc.).

In some embodiments $R^7$ is an organic group that includes a hydroxyl group. In some such embodiments, $R^7$ is of the formula $HO-R^6-$, wherein $R^6$ is as described above. Examples of such $R^7$ groups include hydroxyl alkyl groups preferably having from 1 to 5 carbon atoms (e.g., hydroxy-ethyl, 3-hydroxy-propyl, 2-hydroxy-propyl, 4-hydroxy-butyl; 3-hydroxy-butyl, 2-hydroxy-2-propyl-methyl, 5-hydroxy-pentyl, 4-hydroxy-pentyl, 3-hydroxy-pentyl, 2-hydroxy-pentyl and the pentyl isomers). An example of an NCCR crosslinker including such an $R^7$ group is provided below in Formula (VI):

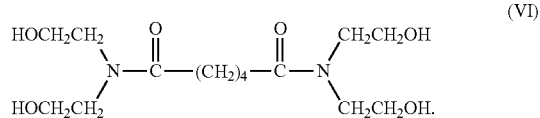

Formula (VI) is believed to be the structure of the PRIMED XL-552 product commercially available from EMS. The corresponding chemical product name for such structure is N,N,N',N'-tetrakis(2-hydroxyethyl)adipamide. The chemical product name for PRIMID XL-552 has been reported as N,N,N',N'-tetrakis(2-hydroxypropyl)adipamide, see International Application Publication No. WO 2016/196190 A1. That report is believed to be incorrect.

In some embodiments, the NCCR crosslinker is a compound having the structure of the below Formula (VII):

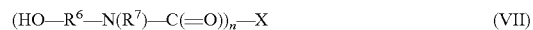

wherein:
$R^6$ and $R^7$ are as described above,
n is 2 or more, and
X is a polyvalent organic group.

In some embodiments, X is an alkylene group. In some embodiments, X is a $-(CH_2)_p-$ group wherein (i) p is 1 or more, 2 or more, 3 or more, 4 or more, and more typically from 2 to 10 and (ii) one or more hydrogens may be replaced with substituent groups (e.g., organic substituent groups). In an embodiment, X is $-(CH_2)_4-$.

In certain preferred embodiments, two or more hydroxyl groups are located "beta" relative to a nitrogen atom, more preferably a nitrogen atom of an amide bond. Thus, for example, in certain preferred embodiments the NCCR crosslinker is a beta-hydroxyalkylamide or beta-hydroxyalkylurea compound. Some examples of such compounds include: bis[N,N-di(β-hydroxy-ethyl)]adipamide, bis[N,N-di(β-hydroxy-propyl)]succinamide, bis[N,N-di(β-hydroxy-ethyl)]azelamide, bis[N,N-di(β-hydroxy-propyl)]adipamide, bis[N-metil-N-(β-hydroxy-ethyl)]oxamide, and mixtures thereof. The PRIMID QM-1260 product commercially available from EMS is an example of a preferred beta-hydroxyalkylamide crosslinker. The structure believed to correspond to the PRIMID QM-1260 product is provided below in Formula (VIII):

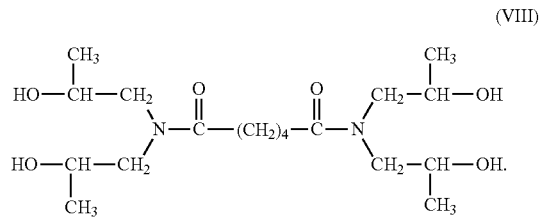

The corresponding chemical product name for such structure is N,N,N',N'-tetrakis(2-hydroxypropyl)adipamide.

Without intending to be bound by theory, the use of NCCR crosslinkers is preferred in certain embodiments due to the formation of an oxazolinium intermediate that is believed to occur and result in enhanced reactivity of the crosslinker with carboxyl groups. Thus, in some embodiments, the NCCR crosslinker is preferably capable of forming an oxazolinium intermediate or other carbon-nitrogen heterocyclic intermediate having enhanced reactivity with carboxyl groups. Preferably, such reactive intermediates are formed under typical food or beverage can coating thermal cure conditions. For example, for beverage inside spray coatings, such reactive intermediates are preferably formed at oven bake conditions of from 188 to 199° C. during an oven residence time of 30 to 85 seconds. Under such conditions, PRIMID QM-1260 appears to be more reactive than PRIMID XL-552, and can provide coatings with comparable flexibility while enabling use at lower addition levels than may be needed for PRIMID XL-552.

PRIMID SF-4510, whose structure has not been reported, is another beta-hydroxyalkylamide crosslinker that may be used in the disclosed coating compositions.

The NCCR crosslinker is preferably formed from reactants that do not include formaldehyde.

In embodiments in which one or more surfactants are used to prepare a latex polymer, the surfactant can be an anionic, a cationic or a zwitterionic surfactant, or a mixture thereof, and also preferably includes one or more salt groups. In preferred embodiments, the surfactant includes one or more neutralized acid or anhydride groups. Examples of suitable neutralized acid groups may include carboxylate groups (—COO$^-$), sulfate groups (—OSO$_3^-$), sulfinate groups (—SOO$^-$), sulfonate groups (—SO$_2$O$^-$), phosphate groups (—OPO$_3^-$), phosphinate groups (—POO$^-$), phosphonate groups (—PO$_3^-$), and combinations thereof.

Anionic surfactants are preferred in some embodiments. Examples of suitable anionic surfactants include any of the following surfactants, which preferably have been at least partially neutralized with a suitable base (e.g., any of the bases disclosed herein): any of the acid- or anhydride-functional polymeric surfactants disclosed herein, dodecylbenzene sulfonic acid, dinonylnaphthalene sulfonic acid, dinonylnaphthylenedisulfonic acid, bis(2-ethylhexyl)sulfosuccinic acid, dioctyl sulfosuccinic acid, sodium lauryl sulfate, sodium dodecyl sulfate, sodium laureth sulfate, fatty acid (ester) sulfonate, polyaryl ether phosphate acid or sulfonate acid, and the like, including mixtures thereof.

In some embodiments, it may be useful to use a surfactant that is a "strong acid" surfactant prior to neutralization. Examples of "strong acid" surfactants include surfactants having a pK$_a$ of less than 4 prior to neutralization.

Although any suitable base may be used to neutralize or partially neutralize polymeric or non-polymeric surfactants to form anionic salt groups, amines are preferred bases, with tertiary amines being particularly preferred. Some examples of suitable tertiary amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Most preferably triethyl amine or dimethyl ethanol amine is used as the tertiary amine.

Some additional examples of neutralizing bases for forming anionic salt groups include inorganic and organic bases such as sodium hydroxide, potassium hydroxide, lithium hydroxide, ammonium hydroxide, and mixtures thereof.

Some examples of neutralizing compounds for neutralizing base groups present on the surfactant and forming cationic salt groups include organic and inorganic acids such as formic acid, acetic acid, hydrochloric acid, sulfuric acid, and combinations thereof.

Although the surfactant may optionally include one or more ethylenically unsaturated groups (e.g., if the surfactant is a polymerizable non-polymeric surfactant), in some embodiments, the surfactant is a saturated surfactant. By way of example, amine-neutralized dodecylbenzenesulfonic acid is considered to be a saturated surfactant. Although amine-neutralized dodecylbenzenesulfonic acid includes an aryl group that includes carbon-carbon double bonds, it does not include any ethylenically unsaturated groups.

The surfactant can be any suitable type of surfactant and may, for example, be a "lower" molecular-weight surfactant (e.g., a surfactant that is non-polymeric or has a number average molecular weight of less than about 1,000 Daltons, more typically less than about 750 Daltons, and even more typically less than about 500 Daltons).

In certain preferred embodiments, a polymeric surfactant is used which has, for example, a number average molecular weight greater than about 2,000 Daltons or even greater than about 4,000 Daltons. It is generally preferable to use a polymeric surfactant or a polymerizable surfactant to, for example, minimize or eliminate the possibility of surfactant migrating out of the cured coating and into the packaged product. Examples of suitable polymeric surfactants may include water-dispersible polymers of the acrylic, alkyd, polyester, polyether, polyolefin, or polyurethane type, including copolymers thereof (e.g., polyether-acrylic copolymers), and mixtures thereof. Typically, such water-dispersible polymers include one or more salt groups to facilitate stable dispersion into water. Examples of suitable such polymer salts are disclosed in U.S. Pat. Nos. 8,092,876 B2 and 9,404,006 B2, and in international Application Publication No. WO 2018/013766 A1 entitled "Latex Coating Composition Having Reduced Flavor Scalping Properties".

An example of a specific water-dispersible polymer for use as a "polymeric surfactant" is a "higher" acid number acid-functional polymer (e.g., an acid number greater than about 40, and more preferably greater than about 100 milligrams KOH per gram polymer). In a preferred embodiment, an acrylic polymer having such an acid number is solution polymerized in organic solvent and then inverted into water (e.g., via at least partial neutralization with a suitable base such as, e.g., an amine or any of the other bases disclosed herein) and used to support emulsion polymerization of the ethylenically unsaturated monomer component. In some embodiments, the acid- or anhydride-functional organic solution polymerized acrylic polymer is formed from an ethylenically unsaturated monomer component that includes acidic monomer; multi-ethylenically unsaturated monomer; one or more of styrene, substituted styrene, branched monomer or cyclic monomer; and optionally any other suitable ethylenically unsaturated monomer. In some such embodiments, the acrylic polymer is styrene-free.

Examples of suitable polymerizable surfactants include those disclosed in U.S. Patent Application Publication No. US 2002/0155235 A1; and those commercially available as REASOAP™ from Adeka Corporation, Tokyo, Japan; NOIGEN™ and HITENOL™ from Da-Ichi Kogyo Siyyaku Co., Ltd., Tokyo, Japan; and SIPOMER™ from Solvay Rhodia, Brussels, Belgium.

In some embodiments, a non-ionic surfactant is included in the reaction mixture used to make the latex polymer. Any suitable non-ionic surfactant may be employed. Examples of suitable non-ionic surfactants include ethoxylated compounds. In some embodiments, the non-ionic compound is a sucrose ester, sorbitan ester, alkyl glycoside, glycerol ester, or mixture thereof. In some embodiments, a non-ionic surfactant is used that includes hydroxyl groups. Non-ionic surfactants that comprise, or are derived from, polysorbate compounds may be used in some embodiments.

In some embodiments, a surfactant or mixture of surfactants as described in International Application Publication No. WO 2017/112837 A1 entitled "Latex Polymer Made Using Metallic-Base-Neutralized Surfactant and Blush-Resistant Coating Compositions Containing Such Polymers" may be used. For example, one or more anionic or zwitterionic surfactant (e.g., non-polymeric surfactant) having an acid group neutralized with a metallic base may be used (e.g., a metallic base including aluminum, calcium, lithium, magnesium, sodium, or potassium). An example of such a surfactant is dioctyl sodium sulfosuccinate.

The latex polymer or other acrylic polymer of the present invention may exhibit any suitable glass transition (Tg)

value(s). In this context, the Tg value refers to the Tg value of the latex polymer (or other acrylic polymer) alone (e.g., prior to formulating a coating composition with additional optional ingredients such as co-resins, crosslinkers, etc.). In some embodiments, it may be desirable that the latex polymer (or other acrylic polymer) has a relatively "high" Tg, such as interior can coatings that will be exposed to sensitive flavor products (e.g., certain colas in which certain flavorants are present at very low concentrations) or chemically aggressive food or beverage products (e.g., high acid, high salt, or high fat). While not intending to be bound by any theory, such a "high" Tg can be beneficial from one or more of the following perspectives: (i) decreased flavor scalping by the cured coating or (ii) enhanced chemical resistance exhibited by the cured coating. In such embodiments, preferred glass transition temperatures for the latex polymer (or other acrylic polymer) include those greater than 40° C., more preferably greater than 50° C., even more preferably greater than 60° C., and in some embodiments greater than 70° C. or greater than 80° C. Preferred glass transition temperatures for the latex polymer (or other acrylic polymer) include those less than 120° C., more preferably less than 115° C., even more preferably less than 110° C., and in some embodiments, less than 100° C. or less than 80° C. The term "latex polymer" is used broadly in the above Tg discussion and is also intended to include latex particles that include, for example, two polymers that are not covalently attached. An example of such a latex particle is one that includes a polymeric surfactant and a polymer resulting from emulsion polymerization of the ethylenically unsaturated component, wherein the two polymers are not covalently attached to one another.

In some embodiments, the Tg of the latex polymer or other acrylic polymer may be less than that described above, such as, for example, less than 40° C., 0 to 40° C., or 20 to 40° C.

Differential scanning calorimetry (DSC) is an example of a useful method for determining the Tg of the latex polymer/particle, with a representative DSC methodology provided in the tests method section described below.

It should be noted that it may not be possible to measure a discrete Tg for certain latex polymers. For example, this may be the case for a gradient Tg latex polymer, which can contain an almost infinite number of Tg stages. For example, one may start polymerization using a high Tg monomer composition feed and then at a certain point in the polymerization start to feed a lower Tg stage monomer composition into the high Tg stage monomer feed. The resulting multistage latex polymer will have a gradient Tg from high to low. A "power feed" process may be used to prepare such compositions. A gradient Tg polymer may also be used in conjunction with multiple multistage Tg polymers. As an example, one may prepare a high Tg monomer feed (F1) and a low Tg monomer feed (F2). One would begin to feed F1 into the latex reactor vessel and initiate polymerization. At a certain period during the F1 feed, one would then feed F2 into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition. For such gradient Tg latex polymers, the Fox equation may be used instead of DSC to calculate Tg. If the monomers used to produce such a latex polymer include one or more monomers not having a homopolymer Tg (e.g., because the monomer does not homopolymerize), then a non-gradient reference latex can be made, in a non-power feed method, using the same overall monomer composition and used to measure Tg.

The overall latex polymer (or other acrylic polymer) may have any suitable acid number so long as the polymer is preferably capable of being stably dispersed into water. While not intending to be bound by any theory, it is believed that the presence of at least some acid groups in the latex polymer is desirable, for example, to enhance the liquid stability of the varnish and crosslinking of the resin system. In embodiments in which a carboxyl-reactive crosslinker is used (e.g., a beta-hydroxyalkylamide compound), the latex polymer (or other acrylic polymer) preferably has an acid number of at least 8, more preferably at least 15, even more preferably at least 20, and optimally at least 30 mg KOH per gram of the polymer. Preferably, the acid number is less than 200, more preferably less than 120, even more preferably less than 100, and optimally less than 80 mg KOH per gram of the polymer. Acid numbers can be measured pursuant to the BS EN ISO 3682-1998 standard. The above acid numbers are inclusive of any acid- or anhydride-functional polymeric surfactant(s) incorporated into the latex polymer/particle, regardless of whether the polymeric surfactant(s) are covalently attached to the emulsion polymerized ethylenically unsaturated monomer component. The above acid numbers do not include any non-polymeric and non-polymerizable surfactant that may have been used to produce the polymer. Neutralized dodecyl benzene sulfonic acid is an example of such a non-polymeric and non-polymerizable surfactant.

When a hydroxyl-functional monomer is used to make the disclosed acrylic polymer, the latex polymer may have any suitable hydroxyl number to achieve the desired result.

Any suitable process or materials may be employed in making the disclosed acrylic (e.g., latex) polymer. In preferred embodiments, the disclosed latex polymer is prepared using a single-stage or multi-stage emulsion polymerization process. The emulsion polymerization process may be conducted in a variety of manners. For example, the emulsion polymerization reaction of the ethylenically unsaturated monomer component can occur as a batch, intermittent, or continuous operation.

In some embodiments, the emulsion polymerization process uses an optional pre-emulsion monomer mixture in which some or all of the reactant components and one or more surfactants are dispersed in the aqueous carrier under agitation to form a stable pre-emulsion. In other embodiments, the ethylenically unsaturated monomer component is polymerized without the use of a pre-emulsion step.

A portion of the surfactant(s) and a portion of the aqueous carrier may also be introduced into a reactor, and are preferably heated, agitated, and held under nitrogen sparge to assist in the subsequent polymerization reactions. Preferred temperatures for heating the surfactant dispersion include temperatures greater than about 65° C., and more preferably from about 70° C. to about 90° C.

The monomer pre-emulsion or non-pre-emulsified ethylenically unsaturated monomer component may be fed to the heated aqueous dispersion in the reactor incrementally or continuously over time. Alternatively, in certain embodiments a batch or semi-batch process may be used to polymerize the reactant monomers in the aqueous dispersion, as described in, for example, the above-mentioned U.S. Pat. No. 8,092,876 B2. In further embodiments, the polymerization process can occur in a classic two-stage (or multiple stage) "core-shell" arrangement. Alternatively, the polymerization process can occur in a multiple stage "inverse core-shell" arrangement as discussed in International Application Publication No. WO 2015/002958 A1.

With regard to the conditions of the emulsion polymerization, the ethylenically unsaturated monomer component is preferably polymerized in aqueous medium with a water-soluble free radical initiator.

The temperature of polymerization is typically from 0° C. to 100° C., preferably from 50° C. to 90° C., more preferably from 70° C. to 90° C., and even more preferably from about 80° C. to about 85° C. The pH of the aqueous medium is usually maintained at a pH of 5 to 12.

In embodiments in which the acrylic polymer is a latex, the free radical initiator can be selected from one or more water-soluble peroxides which are known to act as free radical initiators. Examples include hydrogen peroxide and t-butyl hydroperoxide. Redox initiator systems well known in the art (e.g., t-butyl hydroperoxide, erythorbic acid, and ferrous complexes) can also be employed.

Further examples of polymerization initiators which can be employed include polymerization initiators which thermally decompose at the polymerization temperature to generate free radicals. Examples include both water-soluble and water-insoluble species. Further examples of free radical initiators that can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane; hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like; and combinations thereof.

Polymerization initiators can be used alone or as the oxidizing component of a redox system, which also preferably includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, benzoin and combinations thereof. The reducing component is frequently referred to as an accelerator or a catalyst activator.

The initiator and accelerator (if any) are preferably used in proportion from about 0.001% to 5% each, based on the total weight of monomers used to make the acrylic polymer. Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe(II), and ammonium persulfate/sodium bisulfate/sodium hydrosulfite/Fe(II).

Chain transfer agents can be used to control polymer molecular weight, if desired.

After the polymerization is completed, at least a portion of the carboxylic acid groups or anhydride groups of the latex polymer (or other salt-forming groups such as, e.g., other neutralizable acid groups or neutralizable base groups) may be neutralized or partially neutralized with a suitable basic compound (or other suitable neutralizing compound) to produce water-dispersing groups. The basic compound used for neutralization can be a metallic base, a fugitive base (e.g., ammonia and primary, secondary, or tertiary amines), or a mixture thereof. In preferred embodiments, the base is a fugitive base, more preferably an amine. The degree of neutralization may vary considerably depending upon the amount of acid or base groups included in the latex polymer, and the degree of dispersibility that is desired.

Coating compositions of the present invention preferably include at least a film-forming amount of the latex polymer or other acrylic polymer described herein. In preferred embodiments, the coating composition includes at least about 50 weight %, more preferably at least about 65 weight %, and even more preferably at least about 80 weight % or at least about 90 weight % of the latex polymer (or other acrylic polymer described herein), based on the total resin solids weight of the coating composition. The coating composition includes 100 weight % or less, more typically less than about 99 weight %, and even more typically less than about 95 weight % of the latex polymer (or other acrylic polymer described herein), based on the total resin solids weight of the coating composition. The above weight percentages of latex polymer are inclusive of any surfactant(s) (e.g., polymeric or non-polymeric surfactant) used to make the latex polymer, regardless of whether the surfactant(s) are covalently attached to the emulsion polymerized ethylenically unsaturated monomer component.

The coating composition may be formulated from the latex polymer or other acrylic polymer described herein, optionally with the inclusion of one or more additives. In embodiments in which the coating composition includes one or more additives, the additives preferably do not adversely affect the latex emulsion or other polymer described herein, or a cured coating formed from the coating composition. For example, such optional additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow-control agents, thixotropic agents, dispersing agents, antioxidants, adhesion promoters, light stabilizers, curing agents, co-resins, organosilicon materials, and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulfonic acid (DDBSA, available as CYCAT™ 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in a non-volatile amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is an organosilicon material, such as siloxane-based or polysilicone-based materials. Representative examples of suitable such materials are disclosed in International Application Publication Nos. WO 2014/089410 A1 and WO 2014/186285 A1.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

As previously discussed, the disclosed coating composition includes an NCCR crosslinker, and more preferably a beta-hydroxyalkylamide crosslinker. In addition, or alternatively, the coating may include one or more additional curing agents such as, for example, any of the crosslinkers described below. Preferred crosslinkers are substantially free of each of BPA, BPF, BPS, including glycidyl ether compounds thereof (e.g., BADGE), and epoxy novolacs.

Any of the well-known, hydroxyl-reactive curing resins can be used. For example, phenoplast, blocked isocyanates, and aminoplast curing agents may be used, as well as combinations thereof.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol. Resole phenolics, particularly resole phenolics not made using BPA, BPF, or BPS, are preferred phenoplasts.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins.

As examples of other generally suitable crosslinkers are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof.

The total amount of one or more crosslinkers included in the coating composition may depend on the type of crosslinker, the time and temperature of the bake, and molecular weight. When used, the one or more crosslinkers are typically present in an amount of up to about 50 weight %, preferably up to about 30 weight %, more preferably up to about 15 weight %. If used, the crosslinker is typically present in an amount of at least about 0.1 weight %, more preferably at least about 1 weight %, and even more preferably at least about 2 weight %. These weight percentages are based on the total resin solids weight of the coating composition.

In preferred embodiments, the coating composition includes at least 1 weight %, more preferably at least 2 weight %, and even more preferably at least 3 weight % of one or more NCCR crosslinkers, based on total resin solids of the coating composition. Although the upper amount is not restricted, the coating composition preferably includes less than 20 weight %, more preferably less than 15 weight %, and even more preferably less than 10 weight % of one or more NCCR crosslinkers, based on total resin solids weight of the coating composition. In certain preferred embodiments, the coating composition includes from 4 to 8.5 weight % of one or more NCCR crosslinkers (e.g., Primid QM1260 crosslinker), more preferably from 5 to 7.5 weight % of one or more NCCR crosslinker, based on the total resin solids weight of the coating composition. In some embodiments, the coating composition includes at least the above amount of one or more beta-hydroxyalkylamide crosslinkers.

In embodiments in which excellent "hard-to-hold" food-contact coating performance is desired (e.g., the ability to withstand the corrosive properties of packaging food or products having particularly challenging chemical profiles such as, e.g., certain alcoholic cider beverages), it has been discovered that it can be beneficial to use both an NCCR crosslinker and a phenoplast crosslinker. The use of certain such crosslinker combinations has been observed to result in interior can coatings that have increased chemical resistance when challenged with certain "hard-to-hold" products (e.g., alcoholic ciders), as indicated, for example, by reduced instances of coating blush and reduced aluminum pickup. A preferred combination of such crosslinkers is the combination of one or more beta-hydroxyalkylamides (e.g., the PRIMID QM 1260 crosslinker discussed above) with one or more resole phenolic crosslinkers (more preferably one or more resole phenolics that are not intentionally made with BPA, BPF, or BPS as a starting ingredient). Thus, in some embodiments, the coating composition includes, based on total resin solids: (i) 2 to 10 weight %, 4 to 8.5 weight %, or 5 to 7.5 weight % of NCCR crosslinker (more preferably a beta-hydroxyalkylamide crosslinker); and (ii) 1 to 10 weight %, 3 to 8 weight %, or 4 to 6 weight % of a phenoplast crosslinker (more preferably a resole phenolic crosslinker).

In some embodiments, the coating composition may be cured without the use of an external crosslinker. Additionally, the coating composition may be substantially free of formaldehyde and formaldehyde-containing materials, essentially free of these compounds, essentially completely free of these compounds, or even completely free of these compounds. In preferred embodiments, the coating composition is also substantially free, essentially free, essentially completely free, or completely free of each of BPA, BPF, and BPS, including any diepoxides thereof (e.g., diglycidyl ethers thereof such as the diglycidyl ether of BPA ("BADGE")). In some embodiments, the coating composition is substantially free or completely free of bisphenol compounds.

In preferred embodiments, the coating composition is substantially free or completely free of halogenated monomers (whether free or polymerized), such as chlorinated vinyl monomers.

In some embodiments, such as for certain spray coating applications (e.g., aqueous inside spray for food or beverage cans including, e.g., aluminum beverage cans), the coating composition may have a total solids weight greater than about 5%, more preferably greater than about 10%, and even more preferably greater than about 15%. In these embodiments, the coating composition may also have a total solids weight less than about 40%, more preferably less than about 30%, and even more preferably less than about 25%. In some of these embodiments, the coating composition may have a total solids weight ranging from about 18% to about 22%. The liquid carrier (e.g., aqueous carrier) may constitute the remainder of the weight of the coating composition.

If desired, the coating composition may also include one or more other optional polymers, such as, for example, one or more acrylic polymers, alkyd polymers, epoxy polymers, polyolefin polymers, polyurethane polymers, polysilicone polymers, polyester polymers, and copolymers and mixtures thereof.

In aqueous embodiments, the aqueous carrier of the coating composition preferably includes water and may further include one or more optional organic solvents (e.g., one or more water-miscible solvents). In some embodiments, water constitutes greater than about 20% by weight, more preferably greater than about 35% by weight, and even more preferably greater than about 50% by weight of the total weight of the aqueous carrier. In some embodiments, water constitutes 100% or less, less than about 95% by weight, or less than about 90% by weight of the total weight of the aqueous carrier.

While not intending to be bound by theory, the inclusion of a suitable amount of an organic solvent in the aqueous carrier can be advantageous in some embodiments. Accordingly, in certain embodiments, the one or more organic solvents may constitute greater than 0%, more preferably greater than about 5%, and even more preferably greater than about 10% by weight of the aqueous carrier. In these embodiments, the organic solvents may also constitute less than about 80%, more preferably less than about 65%, and even more preferably less than about 50% or less than about 40% by weight of the aqueous carrier.

In some embodiments, the coating composition is a solvent-based coating composition that preferably includes no more than a de minimus amount (e.g., 0 to 2 weight %) of water. For example, in some embodiments, the coating composition is a styrene-free, organic-solvent-based food or beverage can coating composition that includes a styrene-free organic solution polymerized acid- or anhydride-functional acrylic polymer (e.g., acid number >20 mg KOH/g resin) preferably in combination with one or more NCCR crosslinking agent as described herein. Such organic solution polymerized acid- or anhydride acrylic polymers can have any suitable number average molecular weight (Mn) such as, for example, greater than 3,000, greater than 4,000, greater than 5,000, or even as high as or greater than 30,000 Mn if viscosity can be suitably controlled.

The coating composition preferably has a viscosity suitable for a given coating application. In some embodiments (e.g., aqueous inside spray for food or beverage cans), the coating composition may have an average viscosity greater than about 5 seconds, more preferably greater than 10 seconds, and even more preferably greater than about 15 seconds, based on the Viscosity Test described below. In some embodiments e.g., aqueous inside spray for food or beverage cans), the coating composition may also have an average viscosity less than about 40 seconds, more preferably less than 30 seconds, and even more preferably less than about 25, based on the Viscosity Test described below.

The coating composition of the present invention may be applied to a variety of different substrates using a variety of different coating techniques (e.g., spray coating, roll coating, wash coating, dipping, etc.). In certain preferred embodiments, the coating composition is applied as an inside spray coating. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process. The cured coatings are also suitable for use in food or beverage contact situations (collectively referred to herein as "food-contact"), and may be used on the inside or outside of such cans.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer, and of the overall coating system, will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating thickness of from about 1 to about 60 micrometers and more typically from about 2 to about 15 micrometers. Typically, the overall average dry coating thickness for rigid metal food or beverage can applications will be about 3 to about 10 micrometers. Coating systems for use on closures (e.g., twist-off metal closures) for food or beverage containers may have an overall average dry coating thickness up to about 15 micrometers. In certain embodiments in which the coating composition is used as an interior coating on a drum (e.g., a drum for use with food or beverage products), the overall average dry coating thickness may be approximately 25 micrometers.

The metal substrate used in forming rigid food or beverage cans, or portions thereof, typically has an average thickness in the range of about 125 micrometers to about 635 micrometers. Electro-tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans is provided that includes: applying a coating composition described herein to a metal substrate (e.g., applying the composition to the metal substrate in the form of a planar coil or sheet), hardening the composition, and forming (e.g., via stamping or other deformation process) the substrate into a packaging container or a portion thereof (e.g., a food or beverage can or a portion thereof). For example, two-piece or three-piece cans or portions thereof such as riveted beverage can ends (e.g., soda or beer cans) having a cured coating of the disclosed coating composition on a surface thereof can be formed in such a method. In another embodiment, a method of forming food or beverage cans is provided that includes: providing a packaging container or a portion thereof (e.g., a food or beverage can or a portion thereof), applying a coating composition described herein to the inside, outside or both inside and outside portions of such packaging container or a portion thereof (e.g., via spray application, dipping, etc.), and hardening the composition.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated, curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

In some embodiments, the coating composition is an inside spray coating composition capable of being spray applied on an interior of a food or beverage can (e.g., a 2-piece steel or aluminum food or beverage can) to effectively, and evenly, coat the substrate and form a continuous cured coating (e.g., a coating that exhibits a suitable initial metal exposure value, thereby indicating that the substrate has been effectively coated and is free of unsuitable pores or gaps in the coating).

For interior food-contact coatings, and interior coatings for soda beverage cans in particular, preferred Tg values for the cured coating include those greater than about 50° C., more preferably greater than about 60° C., even more preferably greater than about 70° C., and in some embodiments, greater than about 80° C. Preferred Tg for the cured coating include those less than about 120° C., more preferably less than about 115° C., even more preferably less than about 110° C., and in some embodiments, less than about 100° C. An example of a suitable DSC methodology is provided below.

In some embodiments, the cured coating preferably exhibits desired properties for use as an interior food-contact coating (e.g., inside spray coating) for food and beverage cans. For example, the cured coating preferably gives a global extraction of less than about 25 parts-per-million (ppm), and more preferably less than about 10 ppm, and even more preferably less than about 1 ppm, pursuant to the Global Extraction test below. Additionally, the cured coating preferably exhibits a metal exposure less than about 5 milliamps (mA), more preferably less than about 2 mA, and even more preferably less than about 1 mA, pursuant to the Initial Metal Exposure test below. In addition, the cured coating is preferably free of or substantially free of blush (e.g., exhibits a blush rating of at least 8, more preferably at least 9, and optimally 10) pursuant to the Blush Resistance test described below. For inside spray beverage can coating compositions, preferred cured coatings give metal exposure values after drop damage of less than 30 mA, more preferred values of less than 20 mA, even more preferred values of less than 10 mA, even more preferred values of less than 3.5 mA, even more preferred values of less than 2.5 mA, and even more preferred values of less than 1.5 mA pursuant to the Metal Exposure After Drop Damage test below.

The disclosed coating composition may also offer utility in other coating applications. These additional applications include, but are not limited to, wash coating, sheet coating, and side seam coatings (e.g., food can side seam coatings). Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces.

Because the balance of coating requirements for food or beverage can coatings are particularly stringent and difficult to achieve, it is believed the coating compositions of the present invention may also be suitable for a multitude of other coatings areas, which generally have less stringent coating requirements. For example, the coating compositions of the present invention may be particularly suitable for non-packaging-related coil coating operations (e.g., "industrial" coil coatings). The coating composition may be applied to planar metal stock such as is used, for example, for lighting fixtures; architectural metal skins (e.g., gutter stock, window blinds, siding and window frames); interior or exterior steel building products; HVAC applications; agricultural metal products; industrial coating applications (e.g., appliance coatings); packaging coating applications (e.g., food or beverage cans, drug cans, etc.) and the like. The coating composition may be particularly suited for a coil coating operation where the composition is applied on rapidly moving planar metal coil substrate and then baked at elevated temperatures (e.g., >100° C.) as the coated substrate travels toward an uptake coil winder.

EXEMPLARY EMBODIMENTS

The invention is further illustrated in the following exemplary embodiments:

Embodiment 1 is a coating composition comprising:
a crosslinkable carboxyl-functional acrylic polymer made by polymerizing monomers including acidic monomer, multi-ethylenically unsaturated monomer and optional styrene or substituted styrene;
a nitrogen-containing carboxyl-reactive crosslinker; and
liquid carrier that includes one or both of water and an organic solvent;
wherein the coating composition is a food or beverage can coating composition suitable for use in forming a food-contact coating of a metal food or beverage can and is substantially free of bisphenol A, including epoxides thereof.

Embodiment 1' is the coating composition of Embodiment 1 wherein the monomers include at least 1 weight % styrene or substituted styrene.

Embodiment 1" is the coating composition of Embodiment 1 or of Embodiment 1' wherein the coating composition is substantially free of, more preferably essentially free of, each of bisphenol A, bisphenol F, and bisphenol S, including epoxides thereof.

Embodiment 1''' is a coating composition comprising (a) a crosslinkable carboxyl-functional acrylic polymer made by polymerizing monomers including acidic monomer, multi-ethylenically unsaturated monomer and optional styrene or substituted styrene, and (b) a nitrogen-containing carboxyl-reactive crosslinking agent.

Embodiment 2 is the coating composition of any preceding embodiment, wherein the coating composition is an aqueous coating composition.

Embodiment 3 is a coating composition comprising:
a crosslinkable carboxyl-functional acrylic polymer made by polymerizing monomers including acidic monomer, multi-ethylenically unsaturated monomer and optional styrene or substituted styrene and having a glass transition temperature of greater than 40° C., greater than 50° C., or greater than 60° C.; and
a nitrogen-containing carboxyl-reactive crosslinker;
wherein the coating composition is an aqueous coating composition that is suitable for use in forming a food-contact coating of a metal food or beverage can and is substantially free of bisphenol A.

Embodiment 3' is the coating composition of Embodiment 3 wherein the monomers include at least 1 weight % styrene or substituted styrene.

Embodiment 3" is the coating composition of Embodiment 3 or of Embodiment 3' wherein the coating composition is substantially free of, more preferably essentially free of, each of bisphenol A, bisphenol F, and bisphenol S, including epoxides thereof.

Embodiment 4 is a coating composition comprising:
a crosslinkable carboxyl-functional acrylic polymer made by polymerizing monomers including acidic monomer, multi-ethylenically unsaturated monomer and optional styrene or substituted styrene, monomers comprising more than 1 weight %, more than 2 weight %, more than 3 weight %, more than 4 weight %, more than 5 weight %, more than 6 weight %, more than 7 weight %, more than 8 weight %, more than 9 weight %, more than 10 weight %, more than 11 weight %, more than 12 weight %, more than 13 weight %, or more than 14 weight % of multi-ethylenically unsaturated monomer; and
a nitrogen-containing carboxyl-reactive crosslinker;
wherein the coating composition is an aqueous coating composition that is suitable for use in forming a food-contact coating of a metal food or beverage can and is substantially free of bisphenol A.

Embodiment 4' is the coating composition of Embodiment 4 wherein the monomers include at least 1 weight % styrene or substituted styrene.

Embodiment 4" is the coating composition of Embodiment 4 or of Embodiment 4' wherein the coating composition is substantially free of, more preferably essentially free of, each of bisphenol A, bisphenol F, and bisphenol S, including epoxides thereof.

Embodiment 5 is the coating composition of any of embodiments 1, 1', 1", 1''', 2, 3, 3', 3", 4, 4' or 4", wherein the acrylic polymer has a glass transition temperature of greater than 40° C., greater than 50° C., or greater than 60° C.

Embodiment 6 is the coating composition of any preceding embodiment, wherein the nitrogen-containing carboxyl-reactive crosslinker is not formed from reactants including formaldehyde.

Embodiment 7 is the coating composition of any preceding embodiment, wherein the nitrogen-containing carboxyl-reactive crosslinker includes hydroxyl groups.

Embodiment 8 is the coating composition of any preceding embodiment, wherein the nitrogen-containing carboxyl-reactive crosslinker includes two or more nitrogen atoms.

Embodiment 9 is the coating composition of any preceding embodiment, wherein the nitrogen-containing carboxyl-reactive crosslinker includes at least one amide group, and optionally two or more amide groups.

Embodiment 10 is the coating composition of any preceding embodiment, wherein the nitrogen-containing carboxyl-reactive crosslinker includes a hydroxyl group that is located beta relative to the nitrogen atom of an amide bond.

Embodiment 11 is the coating composition of any preceding embodiment, wherein the nitrogen-containing carboxyl-reactive crosslinker includes two or more groups of the following Formula (V):

$$HO-R^6-N(R^7)-C(=O)- \quad (V)$$

wherein each $R^6$ is independently an organic group, and each $R^7$ is independently hydrogen or an organic group.

Embodiment 12 is the coating composition of embodiment 11, wherein each $R^6$ independently includes from 2 to 10 carbon atoms.

Embodiment 13 is the coating composition of embodiment 12, wherein the depicted hydroxyl group is attached directly to a first carbon atom that is attached directly to a second carbon, and wherein the depicted nitrogen atom is attached directly to the second carbon atom.

Embodiment 14 is the coating composition of any of embodiments 11 to 13, wherein each $R^7$ is independently an organic group that includes a hydroxyl group.

Embodiment 15 is the coating composition of any preceding embodiment, wherein the nitrogen-containing carboxyl-reactive crosslinker comprises one or more groups capable of forming an intermediate having an oxazolinium structure.

Embodiment 16 is the coating composition of any of embodiments 11 to 15, wherein the nitrogen-containing carboxyl-reactive crosslinker comprises a compound having the following Formula (VII):

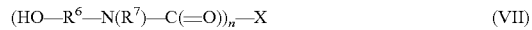

$$(HO-R^6-N(R^7)-C(=O))_n-X \quad (VII)$$

wherein:
$R^6$ and $R^7$ are as described above,
n is 2 or more, and
X is a polyvalent organic group.

Embodiment 17 is the coating composition of embodiment 16, wherein X is an alkylene group.

Embodiment 18 is the coating composition of embodiment 17, wherein the alkylene group is $-(CH_2)_4-$.

Embodiment 19 is the coating composition of any preceding embodiment, wherein the nitrogen-containing carboxyl-reactive crosslinker comprises:

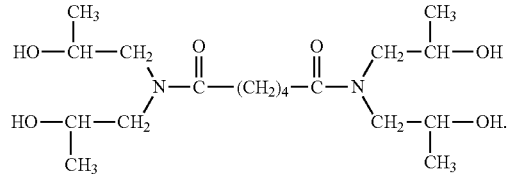

Embodiment 20 is the coating composition of any of embodiments 1 to 18, wherein the nitrogen-containing carboxyl-reactive crosslinker is selected from bis[N,N-di(β-hydroxy-ethyl)]adipamide, bis[N,N-di(β-hydroxy-propyl)]succinamide, bis[N,N-di(β-hydroxy-ethyl)]azelamide, bis[N,N-di(β-hydroxy-propyl)]adipamide, bis[N-metil-N-(β-hydroxy-ethyl)]oxamide, or a mixture thereof.

Embodiment 21 is the coating composition of any of embodiments 1 to 18, wherein the nitrogen-containing carboxyl-reactive crosslinker comprises a beta-hydroxyalkylamide crosslinker.

Embodiment 22 is the coating composition of any of embodiments 1 to 8, wherein the carboxyl-reactive crosslinker includes one or more aziridine, diimide, or oxazoline groups.

Embodiment 23 is the coating composition of any preceding embodiment, wherein the coating composition includes at least 1 weight %, at least 2 weight %, at least 3 weight %, at least 4 weight %, or at least 5 weight %, based on total resin solids, of the carboxyl-reactive crosslinker (e.g., nitrogen-containing carboxyl-reactive crosslinker).

Embodiment 24 is the coating composition of any preceding embodiment, wherein the coating composition includes at least 50 weight percent, based on total resin solids, of the acrylic polymer.

Embodiment 25 is the coating composition of any preceding embodiment, wherein the coating composition includes one or more water-miscible organic solvents.

Embodiment 26 is the coating composition of any preceding embodiment, wherein the coating composition, when thermally cured, has a glass transition temperature of at least 40° C., at least 50° C., or at least 60° C.

Embodiment 27 is the coating composition of any preceding embodiment, wherein the acrylic polymer has a glass transition temperature of from 50 to 80° C.

Embodiment 28 is the coating composition of any preceding embodiment, wherein the acrylic polymer has a number average molecular weight of at least 3,000.

Embodiment 29 is the coating composition of any preceding embodiment, wherein the acrylic polymer has a number average molecular weight of more than 30,000.

Embodiment 30 is the coating composition of any preceding embodiment, wherein the acrylic polymer has an acid number of at least 20 mg KOH/g resin.

Embodiment 31 is the coating composition of any of embodiments 3 to 30, wherein the acrylic polymer is an acrylic latex that is a reaction product of an ethylenically unsaturated monomer component emulsion polymerized in the presence of an aqueous dispersion of a water-dispersible polymer.

Embodiment 32 is the coating composition of embodiment 31, wherein the water-dispersible polymer comprises an acrylic polymer, a polyether polymer, a polyolefin polymer, a polyester polymer, or a mixture or copolymer thereof.

Embodiment 33 is the coating composition of embodiment 32, wherein the water-dispersible polymer comprises an at least partially neutralized acid- or anhydride-functional acrylic polymer.

Embodiment 34 is the coating composition of embodiment 32 or 33, wherein the acrylic polymer is an organic solution polymerized acrylic polymer.

Embodiment 35 is the coating composition of any preceding embodiment, wherein at least a portion of the acrylic polymer is made by polymerizing an ethylenically unsaturated monomer component including at least one monomer having (i) a Tg of more than 40° C. and (ii) one or more groups selected from cyclic groups, branched organic groups, or a combination thereof.

Embodiment 36 is the coating composition of embodiment 35, wherein at least one cyclic group is present.

Embodiment 37 is the coating composition of embodiment 36, wherein the at least one cyclic group is selected from one or more substituted or unsubstituted: cyclobutane groups, cyclopentane groups, cyclohexane groups, phenylene groups, norbornene groups, norbornane groups, tricyclodecane groups, or a combination thereof.

Embodiment 38 is the coating composition of embodiment 35, wherein at least one branched organic group is present.

Embodiment 39 is the coating composition of embodiment 38, wherein the at least one branched organic group is present in a monomer selected from isopropyl methacrylate, isobutyl methacrylate, sec-butyl methacrylate, or a mixture thereof.

Embodiment 40 is the coating composition of embodiment 35, wherein the at least one monomer having (i) and (ii) has the following Formula (III):

$(R^3)_2{-}C{=}C(R^4){-}W_m{-}Y$     (III)

wherein:
$R^3$ is independently selected from hydrogen or an organic group;
$R^4$ is selected from hydrogen or an alkyl group;
W, if present, is a divalent linking group;
m is 0 or 1, more typically 1; and
Y is: (i) a branched organic group including one or more branching atoms, more typically one or more branching carbon atoms, (ii) a cyclic group (e.g., any of the cyclic groups disclosed herein), or (iii) a combination of (i) and (ii).

Embodiment 41 is the coating composition of embodiment 40, wherein Y is a branched organic group of the following Formula (IV):

$-C(CH_3)_t(R^5)_{3-t}$     (IV)

wherein:
t is 0 to 3;
each $R^5$, if present, is independently an organic group that may optionally be itself branched, more typically an alkyl group that may optionally include one or more heteroatoms (e.g., N, O, P, Si, etc.); and
two or more $R^5$ may optionally form a cyclic group with one another.

Embodiment 42 is the coating composition of embodiment 41, wherein t is 1, each $R^5$ comprises an alkyl group, and the total number of carbon atoms in both $R^5$ groups is 6, 7, or 8.

Embodiment 43 is the coating composition of embodiment 41, wherein t is 0, 1, or 2 and at least one $R^5$ is a branched organic group.

Embodiment 44 is the coating composition of any one of embodiments 41 to 43, wherein at least one $R^5$ includes a tertiary or quaternary carbon atom.

Embodiment 45 is the coating composition of any preceding embodiment, wherein the acrylic polymer (e.g., acrylic latex) is formed by polymerizing (e.g., emulsion polymerizing in an aqueous media) an ethylenically unsaturated monomer component comprising at least 10 weight %, at least 20 weight %, at least 30 weight %, and in some embodiments 40 weight % or more of one or more branched or cyclic monomers.

Embodiment 46 is the coating composition of any preceding embodiment, wherein one or both of: (i) the acrylic polymer and (ii) the coating composition are substantially free of each of bisphenols or halogenated monomers.

Embodiment 47 is the coating composition of any of embodiments 3 to 46, wherein the acrylic polymer is an acrylic latex made from an emulsion polymerized ethylenically unsaturated monomer component including multiethylenically unsaturated monomer(s), and wherein the emulsion polymerized ethylenically unsaturated monomer component is substantially free of oxirane-group-containing monomers.

Embodiment 48 is the coating composition of Embodiment 47, wherein the multi-ethylenically unsaturated monomer(s) comprise more than 1 weight %, more than 2 weight %, more than 3 weight %, more than 4 weight %, more than 5 weight %, more than 6 weight %, more than 7 weight %, more than 8 weight %, more than 9 weight %, more than 10 weight %, more than 11 weight %, more than 12 weight %, more than 13 weight %, or more than 14 weight % of the weight of monomers used to make the acrylic polymer.

Embodiment 49 is the coating composition of any of embodiments 4 to 48, wherein the multi-ethylenically unsaturated monomer comprises 1,4-butanediol di(meth)acrylate.

Embodiment 50 is the coating composition of any of embodiments 3 to 49, wherein methyl (meth)acrylate comprises at least 20 weight %, at least 25 weight %, at least 30 weight %, or at least 40 weight % of the weight of monomers used to make the acrylic polymer.

Embodiment 51 is the coating composition of any of embodiments 3 to 50, wherein methyl methacrylate comprises at least 20 weight %, at least 25 weight %, at least 30 weight %, or at least 40 weight % of the weight of monomers used to make the acrylic polymer.

Embodiment 52 is the coating composition of any of embodiments 3 to 51, wherein the ethylenically unsaturated monomer component includes methyl methacrylate and ethyl acrylate.

Embodiment 53 is the coating composition of embodiment 52, wherein the ethylenically unsaturated monomer component includes a hydroxyl-functional (meth)acrylate (e.g., hydroxyethyl methacrylate), and optionally in an amount of at least about 1 weight %, at least about 2 weight %, at least about 3 weight %, at least about 4 weight % or at least about 5 weight %, and up to about 25 weight %, up to about 20 weight %, up to about 18 weight %, up to about 15 weight % or up to about 12 weight %.

Embodiment 54 is the coating composition of any of embodiments 47 to 53, wherein the acrylic latex has a glass transition temperature of greater than 40° C., greater than 50° C., or greater than 60° C.

Embodiment 55 is the coating composition of any preceding embodiment, wherein the coating composition includes, based on total resin solids, from 1 to 20 weight % (e.g., 2 to 10 weight %, 4 to 8.5 weight %, or 5 to 7.5 weight %) of the nitrogen-containing carboxyl reactive crosslinker and from 50 to 99 weight % of the acrylic polymer.

Embodiment 56 is the coating composition of any preceding embodiment, wherein the coating composition is an inside spray beverage can coating composition.

Embodiment 57 is a method of coating a food or beverage can, comprising:
  applying the coating composition of any preceding embodiment on a metal substrate prior to, or after, forming the metal substrate into a food or beverage container or a portion thereof.

Embodiment 58 is the method of embodiment 57, wherein the coating composition is spray applied on the metal substrate.

Embodiment 59 is the method of embodiment 57, wherein the coating composition is spray applied on an interior surface of an aluminum beverage can.

Embodiment 60 is the method of any one of embodiments 57 to 59, and further comprising curing the coating composition on the metal substrate to form a continuous cured coating having an average film thickness of from 2 to 15 microns.

Embodiment 61 is a food or beverage can, or a portion thereof, resulting from the method of any of embodiments 57 to 60.

Embodiment 62 is a food or beverage can, or a portion thereof, having a metal substrate with a cured coating formed from the coating composition of any of embodiments 1 to 56 applied on an interior surface, an exterior surface, or both.

Embodiment 63 is the food or beverage can, or portion thereof, of embodiments 61 or 62, wherein the cured coating has a Tg of at least 50° C., at least 60° C., or at least 70° C.

Embodiment 64 is a food or beverage can, or a portion thereof, having an interior food-contact coating having an overall average dry coating thickness of from 2 to 15 micrometers, wherein:
  the interior food-contact coating is formed from a spray applied aqueous coating composition that includes, based on total resin solids, at least 50 weight % of a crosslinkable carboxyl-functional acrylic latex polymer made by emulsion polymerizing monomers including acidic monomer, multi-ethylenically unsaturated monomer and optional styrene or substituted styrene, and
  the interior food-contact coating has a metal exposure value after drop damage of less than 10 mA when tested pursuant to the Metal Exposure after Drop Damage test disclosed herein.

Embodiment 64' is a food or beverage can, or a portion thereof, of embodiment 64, wherein the acrylic latex polymer is made from monomers including at least 1 weight % styrene or substituted styrene.

Embodiment 64" is a food or beverage can, or a portion thereof, of embodiment 64 or of Embodiment 64', wherein the coating composition is substantially free of, more preferably essentially free of, each of bisphenol A, bisphenol F, and bisphenol S, including epoxides thereof.

Embodiment 65 is the food or beverage can, or a portion thereof, of embodiment 64 or 64', wherein the can comprises an aluminum beverage can and the interior food-contact coating, when spray applied onto an interior of a standard 12 ounce two-piece drawn and ironed aluminum 211 diameter beverage can at a dry film weight of 120 milligrams per can and baked for 50 seconds at an oven temperature of at least 188° C. to achieve a dome peak metal temperature of at least 199° C., gives a metal exposure of less than 20 mA, less than 10 mA, or less than 3.5 mA when tested pursuant to the Metal Exposure after Drop Damage test disclosed herein.

Embodiment 66 is the food or beverage can, or portion thereof, of any of embodiments 64 to 65, wherein the acrylic latex comprises the emulsion polymerized latex of any one of embodiments 3 to 56.

Embodiment 67 is the food or beverage can, or portion thereof, of any of embodiments 64 to 66, wherein the coating composition includes any of the features recited in embodiments 3 to 56.

Embodiment 68 is an inside spray beverage can coating composition, wherein the coating composition comprises an aqueous coating composition that includes, based on total resin solids, at least 50 weight % of a crosslinkable carboxyl-functional acrylic latex polymer made by emulsion polymerizing monomers including acidic monomer, multi-ethylenically unsaturated monomer and optional styrene or substituted styrene; and wherein the inside spray beverage can coating composition, when spray applied onto an interior of a standard 12 ounce two-piece drawn and ironed aluminum 211 diameter beverage can at a dry film weight of 120 milligrams per can and baked for 50 seconds at an oven temperature of at least 188° C. to achieve a dome peak metal temperature of at least 199° C., gives a metal exposure of less than 20 mA, less than 10 mA, or less than 3.5 mA when tested pursuant to the Metal Exposure after Drop Damage test disclosed herein.

Embodiment 68' is the inside spray beverage can coating composition of embodiment 68, wherein the acrylic latex polymer is made from monomers including at least 1 weight % styrene or substituted styrene.

Embodiment 68" is the inside spray beverage can coating composition of embodiment 68 or of Embodiment 68', wherein the coating composition is substantially free of, more preferably essentially free of, each of bisphenol A, bisphenol F, and bisphenol S, including epoxides thereof.

Embodiment 69 is the inside spray beverage can coating composition of embodiment 68, 68' or 68", wherein the acrylic latex polymer comprises the emulsion polymerized latex of any one of embodiments 3 to 56.

Embodiment 70 is the inside spray beverage can coating composition of any of embodiments 68 to 69, wherein the coating composition includes any of the features recited in embodiments 3 to 56.

Embodiment 71 is the inside spray beverage can coating composition of any of embodiments 68 to 70, wherein the acrylic latex polymer has a Tg of greater than 40° C., greater than 50° C., or greater than 60° C.

Embodiment 72 is the inside spray beverage can coating composition of any of embodiments 64 to 71, wherein the acrylic latex polymer is formed from ingredients including an ethylenically unsaturated monomer component including at least one monomer having (i) a Tg of more than 40° C. and (ii) one or more groups selected from cyclic groups, branched organic groups, or a combination thereof.

Embodiment 73 is a coating composition comprising:
an acrylic latex polymer that is made by emulsion polymerizing monomers including acidic monomer, multi-ethylenically unsaturated monomer and optional styrene or substituted styrene and preferably has a glass transition temperature of greater than 40° C., greater than 50° C., or greater than 60° C.;
wherein the coating composition is an aqueous coating composition that is suitable for use in forming a food-contact coating of a metal food or beverage can and is substantially free of bisphenol A; and
wherein the coating composition exhibits an elongation at break of at least 1%, when tested as described herein.

Embodiment 73' is the coating composition of embodiment 73 wherein the acrylic latex polymer is made from monomers including at least 1 weight % styrene or substituted styrene.

Embodiment 73" is the coating composition of embodiment 73 or of Embodiment 73', wherein the coating composition is substantially free of, more preferably essentially free of, each of bisphenol A, bisphenol F, and bisphenol S, including epoxides thereof.

Embodiment 74 is the coating composition of embodiment 73, 73' or 73" comprising any of the features recited in embodiments 3 to 56.

Embodiment 75 is a food or beverage can, or a portion thereof, having an interior food-contact coating formed from the coating composition of any of embodiments 73 to 74.

Embodiment 76 is the food or beverage can, or portion thereof, of embodiment 75 wherein the can comprises an aluminum beverage can, and wherein the interior food-contact coating is an inside spray coating.

Embodiment 77 is the coating composition, method, or can of any preceding embodiment, wherein the coating composition is substantially free of styrene, and optionally substantially free of substituted styrene compounds.

Embodiment 78 is the coating composition, method, or can of any preceding embodiment, wherein the coating composition is made without using any polyolefin polymer.

Embodiment 79 is the coating composition, method, or can of any of embodiments 3 to 78, wherein the acrylic latex polymer is made without using any non-polymeric surfactant.

Embodiment 80 is the coating composition, method, or can of any preceding embodiment, wherein the coating composition is made without using a phosphorus acid compound, or is substantially free of phosphorus acid, or does not contain a phosphorus acid, or contains less than 5 weight %, less than 2 weight % or less than 1 weight % phosphorus acid.

Embodiment 81 is the coating composition, method, or can of any of embodiments 3 to 80, wherein the acrylic latex polymer is made without using a surfactant that is a polymerizable with at least one ethylenically unsaturated monomer.

Embodiment 82 is the coating composition, method, or can of any preceding embodiment, wherein the coating composition includes both the NCCR crosslinker (more preferably a beta-hydroxyalkylamide crosslinker) and a phenoplast crosslinker (more preferably a resole phenolic crosslinker).

Embodiment 83 is the coating composition, method, or can of any preceding embodiment, wherein the coating composition includes, based on total resin solids:
2 to 10 weight %, 4 to 8.5 weight %, or 5 to 7.5 weight % of NCCR crosslinker (more preferably a beta-hydroxyalkylamide crosslinker); and
1 to 10 weight %, 3 to 8 weight %, or 4 to 6 weight % of phenoplast crosslinker (more preferably a resole phenolic crosslinker).

Polymers and coating compositions such as those described in the Examples may be evaluated using a variety of tests including:

Viscosity Test

This test measures the viscosity of a latex emulsion or coating composition for rheological purposes, such as for sprayability and other coating application properties. The test is performed pursuant to ASTM D1200-88 using a Ford Viscosity Cup (a no. 4 cup unless otherwise specified) at 25° C. The results are measured in the units of seconds.

Curing Conditions

For beverage inside spray bakes, the curing conditions typically involve maintaining the temperature measured at the can dome at 188° C. to 199° C. for at least 30 seconds.

Initial Metal Exposure

This test method determines the amount of the inside surface of the can that has not been effectively coated by the sprayed coating. This determination is made through the use of an electrically conductive solution (1% NaCl in deionized water). The interior "inside spray" coating is typically applied using a high pressure airless spray. The following film weights are typically used: 1.6 grams per square meter ("gsm") for a beer can, 2.3 gsm for a soda can, and 3.4 gsm for a can intended for use in packaging a "hard-to-hold" product.

The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display of a suitable measurement apparatus. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2.0 mA on average.

Can Formation

This is a flexibility test for a coating, and correlates to how an inside-spray coating will withstand a can formation process (e.g., necking steps). In this test, the coated can undergoes a can formation process, including a necking step and bottom dome reformation. The formed can is then tested in the electrically conductive solution following the same steps discussed above in the Initial Metal Exposure test.

Metal Exposure After Drop Damage

Drop damage resistance measures the ability of the coated container to resist cracks after being in conditions simulating dropping of a filled can. The ability of a coating to withstand drop damage without rupturing can also be indicative of the ability of the coating to withstand post-coating fabrication steps such as dome reformation and necking. The presence of cracks is measured by passing electrical current via an electrolyte solution, as previously described in the Initial Metal Exposure section. A coated container is filled with the electrolyte solution (1 weight % NaCl in deionized water) and the initial metal exposure is recorded. The electrolyte solution is removed and the can is then filled with room-temperature tap water. For two-piece "inside spray" beverage cans, the film weights described in the Initial Metal Exposure test can be used.

The water-filled can, which does not include a "top" can end, is dropped through a vertical cylindrical tube having a 2 and 7/8 inch (7.3 centimeter) internal diameter, can bottom down, onto two opposing impact wedges (each wedge provides an inclined plane angled upwards at 33 degrees relative to a horizontal plane orthogonal to the vertical cylindrical tube, with the inclined planes angled outward relative to one another). The impact wedges are positioned relative to the cylindrical tube such that two dents are formed opposite one another in the rim area where the can bottom end meets the sidewall (typically referred to as the "chine" of a beverage can). The water-filled can is dropped through the tube from a 24-inch (61 centimeter) height (as measured between the can bottom and the point of impact on the impact wedges) onto the inclined planes.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings give metal exposure values after drop damage of less than 3.5 mA, more preferred values of less than 2.5 mA, and even more preferred values of less than 1.5 mA.

Adhesion

Adhesion testing is performed to assess whether the coating adheres to the coated substrate. The adhesion test is performed according to ASTM D 3359—Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

To assess blush, the coating composition to be assessed is spray applied using an airless sprayer to a standard aluminum beverage can.

Corrosion Resistance

These tests measure the ability of a coating to resist attack by solutions of different levels of aggressiveness. Briefly, a given coating is subjected to a particular solution, as described below, and then measured for adhesion and blush resistance (or whitening), each also described below. For each test, a result is given using a scale of 0-10, based on the Adhesion Resistance or Blush Resistance, where a rating of "10" is best and a rating of "0 is worst.

Corrosion Resistance—Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

Corrosion Resistance—Citric Acid Solution

A 2 weight % solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

Solvent Resistance

The extent of "cure" or crosslinking of a coating is measured as a resistance to solvents, such as MEK (available from Exxon, Newark, N.J.). This test is performed as described in ASTM D 5402-93. The number of double-rubs (viz., one back- and forth motion) is reported. This test is often referred to as "MEK Resistance."

Pasteurization

The Sterilization or Pasteurization test determines how a coating withstands the processing conditions for different types of food products packaged in a container. Typically, a coated substrate is immersed in a water bath and heated for 5-60 minutes at temperatures ranging from 65° C. to 100° C. Unless otherwise specified, the coated substrate was immersed in a deionized water bath for 45 minutes at 85° C. The coated substrate was then removed from the water bath and tested for coating adhesion and blush as described above. Commercially viable coatings preferably provide adequate pasteurization resistance with perfect adhesion (rating of 10) and blush ratings of 5 or more, optimally 9-10.

Glass Transition Temperature ("Tg")

Samples for differential scanning calorimetry ("DSC") testing may be prepared by first applying the liquid resin composition onto aluminum sheet panels. The panels are then baked in a Fisher ISOTEMP™ electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

Global Extraction

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure used in the current invention is described in 21 CFR § 175.300 paragraph (e)(4)(xv) with the following modifications to ensure worst-case scenario performance: (1) the alcohol (ethanol) content is increased to 10% by weight, and (2) the filled containers are held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values are calculated based on surface area of the can (no end) of 44 square inches with a volume of 355 milliliters. Preferred coatings give global extraction results of less than 50 ppm, more preferred results of less than 10 ppm, and even more preferred results of less than 1 ppm. Most preferably, the global extraction results are optimally non-detectable.

Elongation at Break

Elongation at break can be an indicator of flexibility for a cured coating. A cured coating sample suitable for testing can be prepared using a #12 bar to apply liquid coating to release paper, which is then baked in an oven so that the temperature of the coating reaches 380° F. for 45 seconds with a maximum temperature between 390-400° F. An initial indicator of sample flexibility can be obtained if one is able to remove the sample from the free film. Samples that are too brittle to be tested or removed from the release paper to be tested are noted as too brittle. A sample is then cut from the free film using an ASTM-D638 Type V die using a manual die press. The elongation at break of the cured free-film coating sample can be assessed using a test procedure similar to ASTM-D638-10 "Standard Test Method for Tensile Properties of Plastics". A TA Instruments RSA-G2™ tester with free-film geometry can be used in conjunction with TA Instruments TRIOS™ software package to analyze experimental measurements for measured behaviors. A sample width of 3.18 mm and gage length of 7.62 mm can be used. Sample dimensions are entered into the software and the sample is loaded into the film-fiber tension clamp of the instrument. The sample is tested at room temperature and elongated at a Hencky strain rate of 10% per minute to measure the tensile properties of the cured film and determine the elongation at break.

Necking Test

This test measures the flexibility and adhesion of the film following a commercial necking process. Necking is done to facilitate the application of a container end that allows sealing the container. The test involves applying the coating to the container at a recommended film thickness and subjecting the container to a recommended bake (see the above can, coating, and bake specifications in the Curing Conditions, Initial Metal Exposure and Can Formation sections). Prior to the necking process, sample cans typically will have a metal exposure value of <1.0 mA (average of 12 cans) when evaluated using an electrolyte solution as described above. After the necking process, the cans should display no increase in metal exposure compared to the average for 12 non-necked cans. Elevated mA values indicate a fracture in the film which constitutes film failure.

EXAMPLES

The following examples are offered to aid in understanding of the present invention and are not to be construed as limiting the scope thereof. It is to be understood that the particular examples, materials, amounts, and procedures are to be interpreted broadly in accordance with the scope and spirit of the inventions as set forth herein.

Example 1: Preparation of Styrene-Free Latexes

A styrene-free latex emulsion was prepared using the ingredients shown below in Table 1:

TABLE 1

| Component | Ingredient | Weight | Wt. % |
|---|---|---|---|
| Reactor A1 | Water | 1280.00 | 37.21 |
| | Polyethylene glycol sorbitan monolaurate (GLYCOSPERSE ™ L-20 KFG surfactant from Lonza) | 1.92 | 0.0558 |
| | Dioctyl sodium sulfosuccinate (AEROSOL ™ OT 70 surfactant from Cytec Solvay Group) | 2.40 | 0.0698 |
| | Iron sulfate heptahydrate | 0.0045 | 0.0001 |
| | Water | 45.00 | 1.31 |
| Part B1 | Cyclohexyl methacrylate (CHMA) | 406.55 | 11.82 |
| | Ethyl Acrylate | 363.64 | 10.57 |
| | Acrylic Acid | 116.36 | 3.38 |
| | Hydroxy Ethyl Methacrylate | 105.45 | 3.07 |
| | 1,4-Butanediol dimethacrylate | 176.00 | 5.12 |
| Part B2 | GLYCOSPERSE L-20 KFG | 9.28 | 0.27 |
| | AEROSOL OT 70 | 12.80 | 0.37 |
| | Water | 544.00 | 15.81 |
| Initiator C | Isoascorbic acid | 0.90 | 0.0262 |
| | Tertioamyl Hydroperoxide (LUPEROX ™ TAH 85 from Arkema) | 1.60 | 0.0465 |
| | DMEA (dimethyl ethanol amine) | 0.45 | 0.0131 |
| | Water | 147.20 | 4.28 |
| Part D | Water flush | 160.00 | 4.65 |
| Spike redox E1 | LUPEROX TAH 85 | 0.64 | 0.0186 |
| | Isoascorbic acid | 0.3200 | 0.0093 |
| | DMEA | 0.16 | 0.0047 |
| | Iron sulfate heptahydrate | 0.0032 | 0.0001 |
| | Water | 32.00 | 0.9303 |
| Spike redox E2 | LUPEROX TAH 85 | 0.64 | 0.0186 |
| | Isoascorbic acid | 0.3200 | 0.0093 |
| | DMEA | 0.16 | 0.0047 |
| | Iron sulfate heptahydrate | 0.0032 | 0.0001 |
| | Water | 32.00 | 0.9303 |
| Total | | 3439.80 | 100.00 |

Process

Monomer Pre-emulsion preparation. First, a premix was prepared from all the constituents of Part B2. Slow agitation was required at this stage to avoid formation of foam. Once homogeneous, the monomers (Part B1) were added under vigorous agitation at room temperature and stirred for 20 minutes. The medium turned white and liquid.

Latex preparation. The ingredients of Part A1 were loaded in a 6 L reactor equipped with a reflux condenser, thermometer, mechanical stirrer, two metering pumps and nitrogen sparge and the reactor was heated up to 80° C., under moderate agitation. The stable monomer pre-emulsion (resulting from Parts B1 and B2) and the initiator solution (premixed Part C) were then added in the reactor with two separate lines at a constant rate over 180 minutes at 80° C. and under agitation (120-150 revolutions per minute). Once the monomer addition was completed, Part D1 was added and the mixture held for one hour at 80° C. to reach complete conversion.

The redox packages (Part E1 and then Part E2) were added to the reactor to reduce as much as possible the level of free monomers in the resin and then the mixture was held for an additional hour. At this stage, a post-neutralization of the final latex could be used to improve the stability or increase the viscosity of the latex.

The reactor was then slowly cooled down to 40° C. and filtered to collect the resulting latex emulsion. The final latex had a non-volatile content ("NVC") of 34 to 35% (1 g/30 min/180° C.). The resulting latex emulsion is referred to as Example 1, Run 1. An additional latex was prepared in a similar manner using methyl methacrylate in place of CHMA (Example 1, Run 2).

Example 2: Preparation of Additional Styrene-Free Latexes

Using the method of Example 1, additional latex emulsions were prepared, with the composition (by weight parts) of the monomer premix employed in Part B1 for each of Runs 1-4 being noted below in Table 2. The process and materials used were otherwise the same as in Example 1. The measured Tg values for each latex are also provided in Table 2.

TABLE 2

| | Example 2 Latexes | | | |
|---|---|---|---|---|
| Monomers Premix Part B1: | Run 1 | Run 2 | Run 3 | Run 4 |
| MMA (methyl methacrylate) | | 30 | | |
| CHMA | 34.83 | | 41.7 | |
| VEOVA 9 | | | | 34.83 |
| Ethyl acrylate (EA) | 31.13 | 34.7 | 22 | 31.13 |
| Acrylic acid (AA) | 9.96 | 15 | 11.11 | 9.96 |
| 2-Hydroxy ethyl methacrylate (HEMA) | 9.02 | 10.3 | 10.19 | 9.02 |
| 1,4-Butanediol dimethacrylate (BDDMA) | 15.06 | 10 | 15 | 15.06 |
| Tg range (DSC) ° C. | 60-65 | 60-65 | 85-90 | 55-60 |

Example 3: Preparation of Styrene-Containing Latexes

A styrene-containing latex emulsion was prepared using the ingredients shown below in Table 3:

TABLE 3

| Component | Ingredient | Weight | Wt. % |
|---|---|---|---|
| Reactor A1 | Water | 404.68 | 40.47 |
| | GLYCOSPERSE ™ L-20 KFG | 0.50 | 0.05 |
| | AEROSOL ™ OT 70 | 0.62 | 0.06 |
| | Isoascorbic acid | 0.26 | 0.03 |
| | Iron sulfate heptahydrate | 0.0013 | 0.00 |
| | Water | 13.23 | 1.32 |
| Part B1 | Styrene | 119.80 | 11.98 |
| | EA | 107.16 | 10.72 |
| | AA | 34.29 | 3.43 |
| | HEMA | 31.08 | 3.11 |
| | BDDMA | 51.86 | 5.19 |
| Part B2 | GLYCOSPERSE L-20 KFG | 2.73 | 0.27 |
| | AEROSOL OT 70 | 3.77 | 0.38 |
| | Water | 119.64 | 11.96 |
| Initiator C | LUPEROX ™ TAH 85 | 0.47 | 0.05 |
| | GLYCOSPERSE L-20 KFG | 0.07 | 0.01 |
| | AEROSOL OT 70 | 0.08 | 0.01 |
| | Water | 43.38 | 4.34 |
| Part D | Water flush | 37.22 | 3.72 |
| Spike redox E1 | LUPEROX TAH 85 | 0.19 | 0.02 |
| | Isoascorbic acid | 0.09 | 0.01 |
| | Iron sulfate heptahydrate | 0.0009 | 0.00 |
| | Water | 9.43 | 0.94 |
| Spike redox E2 | LUPEROX TAH 85 | 0.19 | 0.02 |
| | Isoascorbic acid | 0.09 | 0.01 |
| | Iron sulfate heptahydrate | 0.0009 | 0.00 |
| | Water | 9.43 | 0.94 |
| Spike redox E3 | LUPEROX TAH 85 | 0.19 | 0.02 |
| | Isoascorbic acid | 0.09 | 0.01 |
| | Iron sulfate heptahydrate | 0.0009 | 0.00 |
| | Water | 9.43 | 0.94 |
| Total | | 1000 | 100.00 |

The process was the same as in Example 1, except that the redox package was added in three portions (Parts E1, E2 and E3) rather than two portions. The final latex had an NVC of 34 to 36% (1 g/30 min/180° C.) and an acid number of 77 to 85.

Example 4: Preparation of Additional Styrene-Containing Latexes

Three additional styrene-containing latex emulsions were prepared using the method of Example 3, and with replacement of the monomers in Part B1 with the monomers and amounts shown below in Table 4:

TABLE 4

| Monomers Premix Part B1: | Example 4 Latexes | | |
|---|---|---|---|
| | Run 1 | Run 2 | Run 3 |
| Styrene | 34.81 | 40.16 | 37.52 |
| EA | 31.13 | 35.87 | 33.5 |
| AA | 9.96 | 9.96 | 9.96 |
| HEMA | 9.03 | 9.02 | 9.02 |
| BDDMA | 15.07 | 5 | 10 |
| Total | 100.00 | 100.00 | 100.00 |

Example 5: Preparation of Styrene-Free, Acid-Functional Acrylic

This preparation was used in some of the coating compositions as an additive to improve substrate wetting performance. A premix of 647.22 parts glacial acrylic acid (GAA), 359.5 parts EA, 431.28 parts MMA, 436.26 parts Butyl CELLOSOLVE™ from Dow Chemical, and 48.29 parts deionized water was prepared in a monomer premix vessel. In a separate vessel, an initiator premix of 86.34 parts LUPEROX™ 26 initiator from Arkema and 240 parts butyl CELLOSOLVE was prepared. To a reaction vessel equipped with a stirrer, reflux condenser, thermocouple, heating and cooling capability, and inert gas blanket, 512.75 parts butyl CELLOSOLVE and 25.15 parts deionized water were added. With agitation and an inert blanket, the reaction vessel was heated to 97 to 102° C. with reflux occurring. Once within the temperature range, 13.40 parts LUPEROX 26 initiator was added. Five minutes after the initiator addition, the monomer premix and the initiator premix were added simultaneously to the reaction vessel over three hours while maintaining the temperature range at 97 to 102° C. with reflux and cooling as needed. The ingredients were allowed to react an additional two hours. If the monomer conversion is not achieved at this stage, an additional initiator premix can be added to the vessel over one hour maintaining the temperature range of 97° C. to 102° C. Sixty minutes after the addition of the second initiator premix, the reaction vessel was cooled to less than 60° C. under agitation. This process yielded an acrylic emulsifying polymer (viz., an acrylic polymeric emulsifier) with solids of ~55.0% NVC, and an acid number of ~300 mg KOH/g resin.

Example 6: Preparation of Styrene-Free, Acid-Functional Acrylic

This preparation was used in some of the coating compositions as an additive to improve substrate wetting performance. Using the method of Example 5 and substituting CHMA for MMA, an acrylic emulsifying polymer (viz., an acrylic polymeric emulsifier) was prepared with solids of ~55.0% NVC, an acid number of ~300 mg KOH/g resin.

Examples 7-15: Styrene-Free Inside Spray Coating Compositions

The coating compositions of Examples 7-15 were prepared using the latex emulsions of Example 2, Runs 1-4 and additional ingredients in the amounts shown below in Table 5. The acrylic polymeric emulsifiers of Examples 5 and 6 were added in additive levels to improve application of the coatings to substrates. The coating compositions were spray applied to the inside of aluminum beverage containers, cured, and evaluated. The coating composition ingredients were added in the order shown in Table 5 with agitation. Ingredients 2 and 3 were premixed before addition. Ingredient 7 was added as needed to obtain a desired final viscosity. Viscosity was evaluated in seconds, using a #2 cup at ambient temperature.

TABLE 5

| Inside Spray Coating Compositions | | | | | | | | | | |
|---|---|---|---|---|---|---|---|---|---|---|
| Spray Coating | | Ex. 7 | Ex. 8 | Ex. 9 | Ex. 10 | Ex. 11 | Ex. 12 | Ex. 13 | Ex. 14 | Ex. 15 |
| "High" Tg Monomer | | CHMA | CHMA | CHMA | MMA | MMA | CHMA | CHMA | VEOVA 9 | VEOVA 9 |
| Latex Tg (° C.) range, DSC | | 60-65 | 60-65 | 60-65 | 60-65 | 60-65 | 80-90 | 80-90 | 55-60 | 55-60 |
| Crosslinker | | None | PRIMID QM 1260 | Phenolic | None | PRIMID QM 1260 | None | PRIMID QM 1260 | None | PRIMID QM 1260 |
| Ingredient 1 | Ex. 2, Run 1 Latex | 1500.0 | 1500.0 | 1500.0 | | | | | | |
| | Ex. 2, Run 2 Latex | | | | 1500.0 | 1500.0 | | | | |
| | Ex. 2, Run 3 Latex | | | | | | 1500.0 | 1500.0 | | |
| | Ex. 2, Run 4 Latex | | | | | | | | 1540.0 | 1540.0 |
| Ingredient 2 | Deionized water | 900.0 | 900.0 | 940 | 1140.0 | 1140.0 | 930.0 | 930.0 | 1065.0 | 1065.0 |
| Ingredient 3 | DMEA | 10.0 | 10.0 | 7.0 | 6.0 | 6.0 | 10.3 | 10.3 | 4.6 | 4.6 |
| Ingredient 4 | Water-Miscible Organic Solvents | 349 | 349 | 149 | 3500 | 350 | 349 | 349 | 356.4 | 356.4 |
| Ingredient 5 | Resole Phenolic Crosslinker | | | 66.0 | | | | | | |
| | Primid QM 1260 Crosslinker | | 92.0 | | | 92.0 | | 91.0 | | 92 |
| Ingredient 6 | Example 5 Acrylic Emulsifier | | | | 41.0 | 41.0 | 33.0 | 33.0 | 33.0 | 33.0 |
| | Example 6 Acrylic Emulsifier | 33.0 | 33.0 | 33.0 | | | | | | |

TABLE 5-continued

Inside Spray Coating Compositions

| Spray Coating | | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| Ingredient 7 | DMEOA | As needed | As needed | As needed | As needed | As needed | As needed | As needed | As needed | As needed |
| Viscosity, No. 2 cup, seconds | | 40 | 40 | 37 | 48 | 48 | 40 | 40 | 38 | 38 |

The coating compositions of Table 5 were sprayed into the interior of 33 cl (330 milliliter) aluminum beverage cans using typical laboratory conditions and a 100 to 140 mg/can dry coating weight (120 mg/can dry coating weight target), and cured at 180 to 200° C. (as measured at the can dome) for 30 to 60 seconds through a gas oven conveyor from Greenbank Technology Ltd. at typical heat schedules for this application. The application and film properties are shown in Table 6 below.

TABLE 6

Styrene-Free Inside Spray Coating Properties

| | Ex. 7 | Ex. 8 | Ex. 9 | Ex. 10 | Ex. 11 | Ex. 12 | Ex. 13 | Ex. 14 | Ex. 15 | Comp Ex. |
|---|---|---|---|---|---|---|---|---|---|---|
| Latex Tg ° C. range, DSC | 60-65 | 60-65 | 60-65 | 60-65 | 60-65 | 80-90 | 80-90 | 55-60 | 55-60 | 80-90 |
| Crosslinker | None | QM 1260 | Resole | None | QM 1260 | None | QM 1260 | None | QM 1260 | None |
| Initial Metal Exposure, mA | <1 | <1 | <1 | <1 | <1 | <1 | <1 | <1 | <1 | 1.3 |
| Metal Exposure after Drop Damage (from initial), mA | >200 | 0.5 | 39.6 | >200 | 0.3 | >200 | 20.5 | >200 | 2.6 | >200 |
| Necking | Fail | Pass | Fail | No Data | No data | Fail | Fail | No Data | No data | No data |
| Dome Reforming | Fail | Pass | Fail | No Data | No Data | Fail | Fail | No Data | No Data | No data |
| Water Pasteur. | Pass | Pass | Pass | Fail | Pass | Pass | Pass | Pass | Pass | Pass |
| 3% Boiling Acetic acid | Pass | Pass | Pass | Fail | Pass | Pass | Pass | Fail | Pass | Fail |

The data in Table 6 illustrates that the use of a nitrogen-containing carboxyl-reactive crosslinker allows for production of a styrene-free latex coating composition yielding sufficient flexibility for use as an interior coating of an aluminum beverage can. As illustrated by Example 9, while the use of resole phenolic crosslinker helped to improve drop can damage resistance relative to Example 7 which lacked crosslinker, the resole phenolic crosslinker did not provide a styrene-free latex coating composition having acceptable flexibility for an inside spray aluminum beverage can coating.

Table 6 also includes a Comparative Example, which is a reproduction of Example 6 of U.S. Patent Application Publication No. US 2016/0009941 A1, formulated for beverage can inside spray application using the same solvent package as the other Examples in Table 6. Although Comparative Example 6 demonstrated a satisfactory initial metal exposure value after spray application, the coating was inflexible and did not exhibit any meaningful drop can damage resistance. As such, the coating was unsuitable for use as a beverage can coating.

A latex coating composition similar to that of Example 11 was tested for elongation at break pursuant to the Elongation at Break test method. The latex was prepared using all of the same monomers as the Example 2, Run 2 latex employed in the coating formulation of Example 11, but using 15 weight % BDDMA rather than 10 weight % BDDMA. The resulting latex had a lower acid number than the latex in the Example 11 formulation. When the sample was tested in tensile elongation it exhibited a linear region of deformation before yielding and then further stretched before breaking, as defined in ASTM-D638-10. The latex by itself (viz., without the other ingredients in the formulation) could not be tested in tensile elongation without further formulation. For example, when a formulation similar to Example 11 was prepared and tested without any PRIMID QM1260 crosslinker, it was too brittle to be tested and could not be removed from the release paper. This representation of the sample, without the PRIMID QM1260 crosslinker, was deemed to be highly inflexible with a low elongation to break. It is believed that the addition of a nitrogen-containing carboxyl-reactive crosslinker (such as PRIMID QM1260) to the sample gives the coating mechanical strength and flexibility in reacting with the latex to form a strong film that can be removed from the release paper and can be tested for tensile elongation. The tensile elongation at break of the aforementioned fully formulated coating composition similar to Example 11 exhibited an elongated at break ranging from between 5 and 10%, which met or exceeded the tensile elongation at break of a commercial styrene-containing latex coating standard.

Examples 16-19: Styrene-Containing Inside Spray Coating Compositions

Using the method of Examples 7-15 and the styrene-containing latex emulsions of Example 4, Runs 1-3, the coating compositions of Examples 16-19 were prepared and evaluated for properties including viscosity before and after storage at room and elevated temperature, with results as shown below in Table 7. The coating compositions were spray applied to the inside of aluminum beverage containers at a dry film weight of 110 milligrams per can, baked for 60 seconds at 193° C. with a total oven time of 3 minutes, and evaluated for properties including initial metal exposure in mA, metal exposure after drop damage in mA, MEK resistance, with results as shown below in Table 8.

TABLE 7

Styrene-Containing Inside Spray Coating Storage Properties

|  | Ex. 16 | Ex. 17 | Ex. 18 | Ex. 19 |
| --- | --- | --- | --- | --- |
| Latex | Ex. 4, Run 1 | Ex. 4, Run 2 | Ex. 4, Run 3 | Ex. 4, Run 3 |
| BDDMA weight 5 | 15 | 5 | 10 | 10 |
| Crosslinker | 5% QM-1260 | 5% QM-1260 | 5% QM-1260 | 5% QM-1260 + Resole Phenolic |
| Initial Viscosity, No. 2 cup, 25° C., seconds | 35 | 36 | 38 | 33 |
| Viscosity, No. 2 cup, 1 month storage at room temperature, seconds | 36 | 37 | 42 | 34 |
| Viscosity, No. 2 cup, 1 month storage at 40° C., seconds | 34 | 37 | 42 | Not Measured |

TABLE 8

Styrene-Containing Inside Spray Coating Performance Properties

|  | Ex. 16 | Ex. 17 | Ex. 18 | Ex. 19 |
| --- | --- | --- | --- | --- |
| Latex | Ex. 4, Run 1 | Ex. 4, Run 2 | Ex. 4, Run 3 | Ex. 4, Run 3 |
| BDDMA weight 5 | 15 | 5 | 10 | 10 |
| Crosslinker | 5% QM-1260 | 5% QM-1260 | 5% QM-1260 | 5% QM-1260 + Resole Phenolic |
| Initial Metal Exposure, average of 20 cans, mA | <1 | <1 | <1 | <1 |
| Metal Exposure after Drop Damage (from initial), average of 15 cans, mA | 4 | 6 | 2 | 12 |
| Water Pasteurization, 30 Minutes at 82° C., Body and Dome | Pass | Pass | Pass | Pass |
| Corrosion Resistance - Acetic Acid, Body | Pass | Pass | Pass | Pass |
| Corrosion Resistance - Acetic Acid, Dome | Fail | Fail | Fail | Pass |
| Corrosion Resistance - Citric Acid, Body and Dome | Pass | Pass | Pass | Pass |

The results in Table 7 show that the disclosed compositions exhibited desirably low viscosity and excellent storage stability. The results in Table 8 show that the disclosed compositions exhibited excellent film integrity, drop damage resistance and corrosion resistance. The "Fail" results observed near the can dome deformation area following citric acid exposure involved some but not all samples, and would be expected to improve to a "Pass" result with minor adjustments in the formulations or coating application conditions.

The complete disclosure of all patents, patent applications, and publications (including material safety data sheets, technical data sheets and product brochures for the raw materials and ingredients used in the Examples), and electronically available material cited herein are incorporated herein by reference as if individually incorporated. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

The invention claimed is:

1. A coating composition comprising (a) a crosslinkable carboxyl-functional acrylic polymer made by polymerizing monomers including an acidic monomer, a multi-ethylenically unsaturated monomer and optionally styrene or substituted styrene, (b) a nitrogen-containing carboxyl-reactive crosslinking agent, wherein the nitrogen-containing carboxyl-reactive crosslinker includes at least one hydroxyl group or one or more aziridine, diimide, or oxazoline groups, and (c) a liquid carrier that includes water and optionally an organic solvent; wherein:

at least a portion of the acrylic polymer is formed from an emulsion polymerized ethylenically unsaturated monomer component including at least one monomer having (i) a Tg of more than 40° C.; and the coating composition, when thermally cured, has a glass transition temperature of at least 40° C.

2. The coating composition according to claim 1, wherein the ethylenically unsaturated monomer component comprises an acrylic latex.

3. The coating composition according to claim 1, wherein the acrylic polymer is a reaction product of an ethylenically unsaturated monomer component polymerized in the presence of an aqueous dispersion of a water-dispersible polymer.

4. The coating composition according to claim 3, wherein the water-dispersible polymer comprises an organic solution polymerized acrylic polymer.

5. The coating composition according to claim 1, wherein the coating composition is substantially free of each of bisphenol A, bisphenol F, and bisphenol S, including epoxides thereof.

6. The coating composition according to claim 1, wherein the acrylic polymer is made from about 5 to about 20 weight % of acid-functional monomer based on the total weight of monomer used to make the acrylic polymer.

7. The coating composition according to claim 1, wherein the acrylic polymer has an acid number of at least 20 mg KOH/g resin.

8. The coating composition according to claim 1, wherein the multi-ethylenically unsaturated monomer comprises a polyhydric alcohol ester of acrylic acid or methacrylic acid, and wherein the acrylic polymer is made from greater than 2 and up to about 10 weight % multi-ethylenically unsaturated monomer based on the total weight of monomers used to make the acrylic polymer.

9. The coating composition according to claim 1, wherein at least a portion of the acrylic polymer is formed from an emulsion polymerized ethylenically unsaturated monomer component including at least one monomer having (i) a Tg of more than 50° C. and (ii) one or more groups selected from cyclic groups, branched organic groups, or a combination thereof.

10. The coating composition according to claim 1, wherein the acrylic polymer includes at least one branched organic group.

11. The coating composition according to claim 10, wherein the at least one branched organic group is provided by forming the acrylic polymer from isopropyl methacrylate, isobutyl methacrylate, sec-butyl methacrylate, or a mixture thereof.

12. The coating composition according to claim 1, wherein the nitrogen-containing carboxyl-reactive crosslinker includes one or more aziridine, diimide, or oxazoline groups.

13. The coating composition according to claim 1, wherein the nitrogen-containing carboxyl-reactive crosslinker includes at least one amide group.

14. The coating composition according to claim 1, wherein the nitrogen-containing carboxyl-reactive crosslinker comprises a beta-hydroxyalkylamide or beta-hydroxyalkylurea compound.

15. The coating composition according to claim 1, wherein the nitrogen-containing carboxyl-reactive crosslinker comprises N,N,N',N'-tetrakis(2-hydroxypropyl)adipamide or N,N,N',N'-tetrakis(2-hydroxyethyl)adipamide.

16. The coating composition according to claim 1, wherein the coating composition includes both the nitrogen-containing carboxyl reactive crosslinker and a resole phenolic crosslinker.

17. The coating composition according to claim 1, wherein the coating composition comprises an aqueous in spray beverage can coating composition that is substantially free of bisphenol A; and wherein the coating composition includes, based on total resin solids, at least 50 weight % of the acrylic polymer in the form of an emulsion polymerized latex having an acid number of at least 20 mg KOH/g resin.

18. A food or beverage container at least a portion of which is coated with a cured coating formed from a coating composition comprising (a) a crosslinkable carboxyl-functional acrylic polymer having an acid number of at least 20 mg KOH/g resin made by polymerizing monomers including an acidic monomer, a multi-ethylenically unsaturated monomer and optionally styrene or substituted styrene, and (b) a nitrogen-containing carboxyl-reactive crosslinking agent, wherein the nitrogen-containing carboxyl-reactive crosslinker includes at least one hydroxyl group or one or more aziridine, diimide, or oxazoline groups; wherein:
at least a portion of the acrylic polymer is formed from an emulsion polymerized ethylenically unsaturated monomer component including at least one monomer having (i) a Tg of more than 40° C.; and
the cured coating has a glass transition temperature of at least 40° C.

19. An article having a metal substrate, wherein at least a portion of the metal substrate has a cured coating disposed thereon formed from a coating composition comprising (a) a crosslinkable carboxyl-functional acrylic polymer having an acid number of at least 20 mg KOH/g resin made by polymerizing monomers including an acidic monomer, a multi-ethylenically unsaturated monomer and optionally styrene or substituted styrene, and (b) a nitrogen-containing carboxyl-reactive crosslinking agent, wherein the nitrogen-containing carboxyl-reactive crosslinker includes at least one hydroxyl group or one or more aziridine, diimide, or oxazoline groups; wherein:
at least a portion of the acrylic polymer is formed from an emulsion polymerized ethylenically unsaturated monomer component including at least one monomer having (i) a Tg of more than 40° C.; and
the cured coating has a glass transition temperature of at least 40° C.

* * * * *